US012689480B2

(12) United States Patent
Khoshnevisan et al.

(10) Patent No.: US 12,689,480 B2
(45) Date of Patent: Jul. 21, 2026

(54) TECHNIQUES FOR INTERPRETING DOWNLINK CONTROL INFORMATION (DCI) FIELDS IN CODEBOOK-BASED MULTI-PANEL DEPLOYMENTS WITH DYNAMIC PANEL SWITCHING

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 18/354,503

(22) Filed: Jul. 18, 2023

(65) Prior Publication Data

US 2024/0048327 A1 Feb. 8, 2024

Related U.S. Application Data

(60) Provisional application No. 63/394,567, filed on Aug. 2, 2022.

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0639* (2013.01); *H04W 72/1268* (2013.01); *H04W 72/23* (2023.01)

(58) Field of Classification Search
CPC ... H04L 5/0051; H04L 5/0023; H04L 5/0094; H04B 7/0639; H04W 72/1268; H04W 72/23

(Continued)

(56) References Cited

U.S. PATENT DOCUMENTS

2020/0367217 A1 11/2020 Wang et al.
2022/0123799 A1 4/2022 Varatharaajan et al.
(Continued)

FOREIGN PATENT DOCUMENTS

WO WO-2022031427 A1 * 2/2022 ........... H04L 5/0023

OTHER PUBLICATIONS

International Search Report and Written Opinion—PCT/US2023/070494—ISA/EPO—Dec. 13, 2023 (2206507WO).

(Continued)

*Primary Examiner* — Rownak Islam

(74) *Attorney, Agent, or Firm* — QUALCOMM Incorporated

(57) ABSTRACT

Methods, systems, and devices for wireless communications are described. In some aspects, a user equipment (UE) and a network entity may support one or more configuration- or signaling-based mechanisms according to which the network entity may configure one or more maxRank values and maximum number of ports values and according to which the UE may interpret one more downlink control information (DCI) fields to identify, ascertain, or otherwise determine information associated with a codebook (CB)-based uplink shared channel message. For example, the UE may support a first interpretation of DCI fields if a first quantity of maxRank values or maximum number of ports values are indicated and may support a second interpretation of DCI fields if a second quantity of maxRank values or maximum number of ports values are indicated.

30 Claims, 16 Drawing Sheets

(51) Int. Cl.
*H04W 72/1268* (2023.01)
*H04W 72/23* (2023.01)

(58) Field of Classification Search
USPC .......................................................... 370/329
See application file for complete search history.

(56) References Cited

U.S. PATENT DOCUMENTS

2022/0417965 A1* 12/2022 Wang ................... H04B 7/0617
2024/0178969 A1* 5/2024 Gao ...................... H04L 5/0051
2024/0357584 A1* 10/2024 Gao ...................... H04L 5/0035

OTHER PUBLICATIONS

Qualcomm Incorporated: "Simultaneous Multi-Panel Transmission", R1-2205019, 3GPP TSG-RAN WG1 Meeting #109-e, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052203881, 10 pages, Section 2, Proposal 2, p. 2, figure 1.

VIVO: "Views on UL Preceding Indication for Multi-panel Transmission", 3GPP TSG RAN WG1 #109-e, R1-2203546, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 11 Pages, XP052153021, Section 2.2.3, p. 3.

ZTE: "Enhancements on Multi-TRP for PDCCH, PUCCH and PUSCH", 3GPP Draft, 3GPP TSG RAN WG1 Meeting #104-e, R1-2100286, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051970901, 25 Pages, Sections 2.3.1-2.3.2, p. 21-p. 22, Figures 2.3-1, p. 9-p. 16.

* cited by examiner

TPMI Field(s)

220        225        230

Control Message(s)     DCI Message

TRP 205-a     205-b

TRP 115     210     215     105

Codepoint 245-a:

Codepoint 245-b:

Codepoint 245-c:

Codepoint 245-d:

Time

200

105

205-b

TRP     TRP 205-a 405-a     405-b

115

FDM Scheme 410-a        FDM Scheme 410-b

RV1

RV2

RV1

RBs

Symbols

RBs

Symbols

TCI State Associated with First SRS Resource Set 415

TCI State Associated with Second SRS Resource Set 420

400

710

720

715

705

700

PUSCH Configuration Component

1325

PUSCH Component

1335

UE Capability Component

1345

DCI Message

1330

DCI Generation Component

1340

1320

1300

130

105

115

Network
Entity

Transceiver

1410

Antenna

1415

Communications
Manager

1420

Memory

Code

1430

1425

1440

Processor

1435

1405

1400

Figure 15:
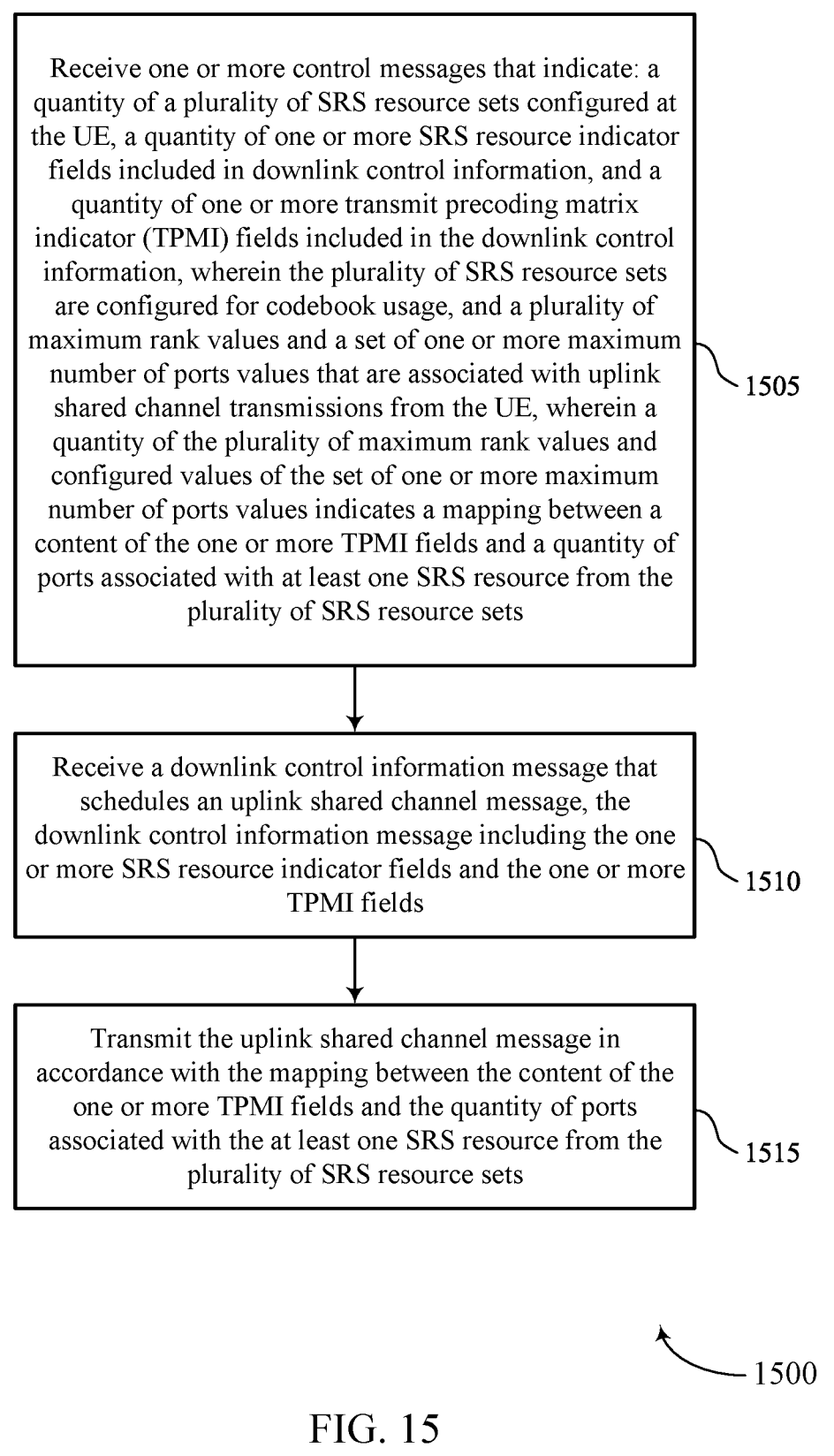

Receive one or more control messages that indicate: a quantity of a plurality of SRS resource sets configured at the UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets

1505

Receive a downlink control information message that schedules an uplink shared channel message, the downlink control information message including the one or more SRS resource indicator fields and the one or more TPMI fields

1510

Transmit the uplink shared channel message in accordance with the mapping between the content of the one or more TPMI fields and the quantity of ports associated with the at least one SRS resource from the plurality of SRS resource sets

Figure 16:
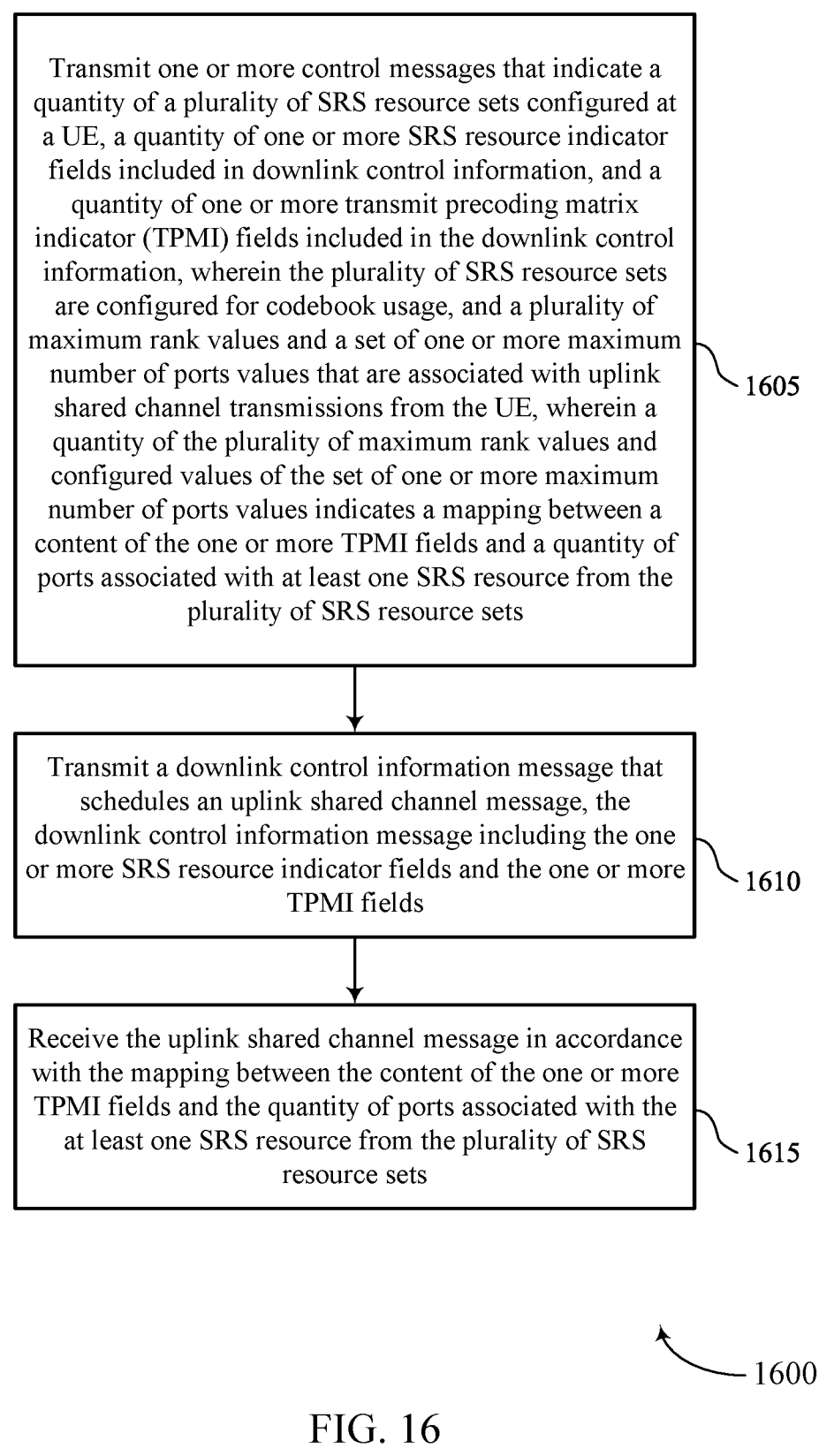

Transmit one or more control messages that indicate a quantity of a plurality of SRS resource sets configured at a UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets

1605

Transmit a downlink control information message that schedules an uplink shared channel message, the downlink control information message including the one or more SRS resource indicator fields and the one or more TPMI fields

1610

Receive the uplink shared channel message in accordance with the mapping between the content of the one or more TPMI fields and the quantity of ports associated with the at least one SRS resource from the plurality of SRS resource sets

TECHNIQUES FOR INTERPRETING DOWNLINK CONTROL INFORMATION (DCI) FIELDS IN CODEBOOK-BASED MULTI-PANEL DEPLOYMENTS WITH DYNAMIC PANEL SWITCHING

CROSS REFERENCE

The present application for patent claims the benefit of U.S. Provisional Patent Application No. 63/394,567 by KHOSHNEVISAN et al., entitled "TECHNIQUES FOR INTERPRETING DOWNLINK CONTROL INFORMATION (DCI) FIELDS IN CODEBOOK-BASED MULTI-PANEL DEPLOYMENTS WITH DYNAMIC PANEL SWITCHING," filed Aug. 2, 2022, assigned to the assignee hereof, and expressly incorporated by reference herein.

FIELD OF TECHNOLOGY

The following relates to wireless communications, including techniques for interpreting downlink control information (DCI) fields in codebook-based multi-panel deployments with dynamic panel switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for interpreting downlink control information (DCI) fields in codebook-based multi-panel deployments with dynamic panel switching. For example, the described techniques provide for a signaling-based mechanism according to which a user equipment (UE) may dynamically switch between communicating with a single transmission and reception point (TRP) in a single TRP (sTRP) operation mode and communicating with multiple TRPs in a multi-TRP (mTRP) operation mode while supporting various configurations relating to how many layers the UE may use for uplink shared channel, such as physical uplink shared channel (PUSCH), transmissions. In some implementations, for example, the UE may use a first interpretation of one or more DCI fields in accordance with receiving an indication of a first configuration relating to how many layers the UE may use for PUSCH transmissions and may use a second interpretation of one or more DCI fields in accordance with receiving an indication of a second configuration relating to how many layers the UE may use for PUSCH transmissions. In some implementations, the first and second interpretations may refer to how the UE interprets a content of one or more transmission precoding matrix indicator (TPMI) fields included in a DCI scheduling a codebook (CB)-based PUSCH transmission.

A method for wireless communication at a UE is described. The method may include receiving one or more control messages that indicate: a quantity of a set of multiple sounding reference signal (SRS) resource sets configured at the UE, a quantity of one or more SRS resource indicator (SRI) fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, receiving a downlink control information message that schedules an uplink shared channel message, the downlink control information message including the one or more SRI fields and the one or more TPMI fields, and transmitting the uplink shared channel message in accordance with the mapping between the content of the one or more TPMI fields and the quantity of ports associated with the at least one SRS resource from the set of multiple SRS resource sets.

An apparatus for wireless communication at a UE is described. The apparatus may include a processor, memory coupled with the processor, and instructions stored in the memory. In some aspects, the apparatus may include one or more memories storing processor-executable code and one or more processors coupled with the one or more memories. The one or more processors may, when executing the code, be configured to receive one or more control messages that indicate: a quantity of a set of multiple SRS resource sets configured at the UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, receive a downlink control information message that schedules an uplink shared channel message, the downlink control information message including the one or more SRI fields and the one or more TPMI fields, and transmit the uplink shared channel message in accordance with the mapping between the content of the one or more TPMI fields and the quantity of ports associated with the at least one SRS resource from the set of multiple SRS resource sets.

Another apparatus for wireless communication at a UE is described. The apparatus may include means for receiving one or more control messages that indicate: a quantity of a set of multiple SRS resource sets configured at the UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, means for receiving a downlink control information message that schedules an uplink shared channel message, the downlink control information message including the one or more SRI fields and the one or more TPMI fields, and means for transmitting the uplink shared channel message in accordance with the mapping between the content of the one or more TPMI fields and the quantity of ports associated with the at least one SRS resource from the set of multiple SRS resource sets.

A non-transitory computer-readable medium storing code for wireless communication at a UE is described. The code may include instructions executable by a processor to receive one or more control messages that indicate: a quantity of a set of multiple SRS resource sets configured at the UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, receive a downlink control information message that schedules an uplink shared channel message, the downlink control information message including the one or more SRI fields and the one or more TPMI fields, and transmit the uplink shared channel message in accordance with the mapping between the content of the one or more TPMI fields and the quantity of ports associated with the at least one SRS resource from the set of multiple SRS resource sets.

In some examples of the method, apparatuses, and non-transitory computer-readable medium described herein, receiving the downlink control information message may include operations, features, means, or instructions for interpreting the one or more TPMI fields in accordance with the mapping indicated by the quantity of the set of multiple maximum rank values and the configured values of the set of one or more maximum number of ports values, where the one or more TPMI fields indicate up to a quantity of ports for each SRS resource indicated by the one or more SRI fields.

In some examples of the method, apparatuses, and non-transitory computer-readable medium described herein, receiving the one or more control messages may include operations, features, means, or instructions for receiving an indication of a configuration associated with the set of multiple maximum rank values, where the configuration may be either a first configuration or a second configuration, where the first configuration indicates that, if the uplink shared channel message may be associated with a single SRS resource set, a maximum quantity of ports associated with the uplink shared channel message may be equal to a larger between a first maximum quantity of ports of a first SRS resource and a second maximum quantity of ports of a second SRS resource, and the second configuration indicates that, if the uplink shared channel message may be associated with the single SRS resource set, the maximum quantity of ports associated with the uplink shared channel message may be equal to a summation of the first maximum quantity of ports of the first SRS resource and the second maximum quantity of ports of the second SRS resource.

Some examples of the method, apparatuses, and non-transitory computer-readable medium described herein may further include operations, features, means, or instructions for transmitting, via a capability report, information associated with the maximum quantity of ports the UE may be capable of supporting when the uplink shared channel message may be associated with the single SRS resource set, or when the uplink shared channel message may be associated with multiple SRS resource sets, or both.

In some examples of the method, apparatuses, and non-transitory computer-readable medium described herein, receiving the one or more control messages that indicate the set of multiple maximum rank values and the one or more maximum number of ports values may include operations, features, means, or instructions for receiving an indication of a respective maximum rank value for each respective SRS resource set of the set of multiple SRS resource sets configured at the UE and receiving an indication of a respective maximum number of ports value for each respective SRS resource set of the set of multiple SRS resource sets.

In some examples of the method, apparatuses, and non-transitory computer-readable medium described herein, the set of multiple maximum rank values includes a first maximum rank value associated with a first SRS resource set and a second maximum rank value associated with a second SRS resource set, the one or more maximum number of ports values includes a first maximum number of ports value associated with a first SRS resource indicated from the first SRS resource set and a second maximum number of ports value associated with a second SRS resource indicated from the second SRS resource set, and the mapping indicates that a first TPMI field indicates a first rank value less than or equal to the first maximum rank value and indicates a first quantity of ports less than the first maximum number of ports value associated with the first SRS resource if a first codepoint associated with the first SRS resource set may be included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set may be included in the SRS resource set indicator field of the downlink control information message; and the first TPMI field and the second TPMI field each indicate respective ranks that may be less than or equal to the first maximum rank value and the second maximum rank value, respectively, and indicate respective quantities of ports that may be less than or equal to the first maximum number of ports value and the second maximum rank value, respectively, if a third codepoint associated with both the first SRS resource set and the second SRS resource set may be included in the SRS resource set indicator field of the downlink control information message.

In some examples of the method, apparatuses, and non-transitory computer-readable medium described herein, receiving the one or more control messages that indicate the set of multiple maximum rank values may include operations, features, means, or instructions for receiving an indication of a baseline maximum rank value and a baseline maximum number of ports value that may be applicable to any one or more of the set of multiple SRS resource sets or any one or more SRS resources, respectively, when the uplink shared channel message may be associated with a single SRS resource set, receiving an indication of a respective set of one or more maximum rank values for each respective SRS resource set of the set of multiple SRS resource sets, where the respective set of one or more maximum rank values for each respective SRS resource set may be applicable to that respective SRS resource set when the uplink shared channel message may be associated with at least two SRS resource sets, and where the baseline maximum rank value may be less than or equal to a summation of the respective set of one or more maximum rank values for each respective SRS resource set of the set of multiple SRS resource sets, and receiving an indication of a respective set of one or more maximum number of ports values for each respective SRS resource set of the set of multiple SRS resource sets, where the respective set of one or more maximum number of ports values for each respective SRS resource set may be applicable to that respective SRS resource set when the uplink shared channel message may be associated with the at least two SRS resource sets, and where the baseline maximum number of ports value may be less than or equal to a summation of the respective set of one or more maximum number of ports values for each respective SRS resource set from the set of multiple SRS resource sets.

In some examples of the method, apparatuses, and non-transitory computer-readable medium described herein, the set of multiple maximum rank values includes the baseline maximum rank value that may be applicable to both a first SRS resource set and a second SRS resource set, a first maximum rank value that may be applicable to the first SRS resource set, and a second maximum rank value that may be applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set may be included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set may be included in the SRS resource set indicator field of the downlink control information message; and the first TPMI field and the second TPMI field indicate respective ranks that may be less than or equal to the first maximum rank value and the second maximum rank value, respectively, and indicate respective quantities of ports that may be less than or equal to the first maximum number of ports value and the second maximum number of ports value, respectively, if a third codepoint associated with both the first SRS resource set and the second SRS resource set may be included in the SRS resource set indicator field of the downlink control information message.

In some examples of the method, apparatuses, and non-transitory computer-readable medium described herein, the set of multiple maximum rank values includes the baseline maximum rank value that may be applicable to both a first SRS resource set and a second SRS resource set, a first maximum rank value that may be applicable to the first SRS resource set, and a second maximum rank value that may be applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set may be included in a single SRI field; the single TPMI field indicates a second rank less than or equal to the baseline maximum rank value and indicates a second quantity of ports less than or equal to the baseline maximum number of ports value if an optional second codepoint associated with the second SRS resource set may be included in the single SRI field; and the single TPMI field indicates two ranks that may be less than or equal to the first maximum rank value and the second maximum rank value, respectively, and indicates two quantities of ports that may be less than or equal to the first maximum number of ports value and the second maximum number of ports value, respectively, if a third codepoint associated with both the first SRS resource set and the second SRS resource set may be included in the single SRI field.

In some examples of the method, apparatuses, and non-transitory computer-readable medium described herein, the set of multiple maximum rank values includes the baseline maximum rank value that may be applicable to both a first SRS resource set and a second SRS resource set, a first maximum rank value that may be applicable to the first SRS resource set, and a second maximum rank value that may be applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set may be included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set may be included in the joint field; and the joint field indicates the first SRS resource and the second SRS resource, two ranks that may be less than or equal to the first maximum rank value and the second maximum rank value, respectively, and two quantities of ports that may be less than or equal to the first maximum number of ports value and the second maximum number of ports value, respectively, if a third codepoint associated with both the first SRS resource set and the second SRS resource set may be included in the joint field.

In some examples of the method, apparatuses, and non-transitory computer-readable medium described herein, the set of multiple maximum rank values includes the baseline maximum rank value that may be applicable to one or both of a first SRS resource set and a second SRS resource set, a first maximum rank value that may be applicable to a third SRS resource set, and a second maximum rank value that may be applicable to a fourth SRS resource set, the one or more maximum number of ports values includes the baseline maximum number of ports value that may be applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set may be included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set may be included in the SRS resource set indicator field of the downlink control information message; and the first TPMI field and the second TPMI field indicate respective ranks that may be less than or equal to the first maximum rank value and the second maximum rank value, respectively, and indicate respective quantities of ports that may be less than or equal to the first maximum number of ports value and the second maximum number of ports value, respectively, if a third codepoint associated with both the third SRS resource set and the fourth SRS resource set may be included in the SRS resource set indicator field of the downlink control information message.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, the set of multiple maximum rank values includes the baseline maximum rank value that may be applicable to one or both of a first SRS resource set and a second SRS resource set, a first maximum rank value that may be applicable to a third SRS resource set, and a second maximum rank value that may be applicable to a fourth SRS resource set, the one or more maximum number of ports values includes the baseline maximum number of ports value that may be applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set may be included in a single SRI field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set may be included in the single SRI field of the downlink control information message; and the single TPMI field indicates two ranks that may be less than or equal to the first maximum rank value and the second maximum rank value, respectively, and two quantities of ports that may be less than or equal to the first maximum number of ports value and the second maximum number of ports value, respectively, if a third codepoint associated with both the third SRS resource set and the fourth SRS resource set may be included in the single SRI field of the downlink control information message.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, a joint field indicates an SRS resource from the first SRS resource set, a first rank less than or equal to the baseline maximum rank value, and a first quantity of ports less than or equal to the baseline maximum number of ports value if a first codepoint associated with the first SRS resource set may be included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set may be included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set may be included in the joint field.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, each maximum rank value of the set of multiple maximum rank values may be indicated per SRS resource set, per downlink control information format, per bandwidth part, or per component carrier.

In some examples of the method, apparatuses, and non-transitory computer-readable medium described herein, transmitting the uplink shared channel message in accordance with the mapping may include operations, features, means, or instructions for transmitting the uplink shared channel message using one or more spatial domain filters corresponding to the one or more TPMI fields.

In some examples of the method, apparatuses, and non-transitory computer-readable medium described herein, the downlink control information message indicates a dynamic switch between single transmission and reception point (TRP) operation and multi-TRP operation.

A method for wireless communication at a network entity is described. The method may include transmitting one or more control messages that indicate a quantity of a set of multiple SRS resource sets configured at a UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, transmitting a downlink control information message that schedules an uplink shared channel message, the downlink control information message including the one or more SRI fields and the one or more TPMI fields, and receiving the uplink shared channel message in accordance with the mapping between the content of the one or more TPMI fields and the quantity of ports associated with the at least one SRS resource from the set of multiple SRS resource sets.

An apparatus for wireless communication at a network entity is described. The apparatus may include a processor, memory coupled with the processor, and instructions stored in the memory. In some aspects, the apparatus may include one or more memories storing processor-executable code and one or more processors coupled with the one or more memories. The one or more processors may, when executing the code, be configured to transmit one or more control messages that indicate a quantity of a set of multiple SRS resource sets configured at a UE, a quantity of one or more SRI fields included in downlink control information, and a quantity of one or more TPMI fields included in the down-link control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, transmit a downlink control information message that schedules an uplink shared channel message, the downlink control information message including the one or more SRI fields and the one or more TPMI fields, and receive the uplink shared channel message in accordance with the mapping between the content of the one or more TPMI fields and the quantity of ports associated with the at least one SRS resource from the set of multiple SRS resource sets.

Another apparatus for wireless communication at a network entity is described. The apparatus may include means for transmitting one or more control messages that indicate a quantity of a set of multiple SRS resource sets configured at a UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, means for transmitting a downlink control information message that schedules an uplink shared channel message, the down-link control information message including the one or more SRI fields and the one or more TPMI fields, and means for receiving the uplink shared channel message in accordance with the mapping between the content of the one or more TPMI fields and the quantity of ports associated with the at least one SRS resource from the set of multiple SRS resource sets.

A non-transitory computer-readable medium storing code for wireless communication at a network entity is described. The code may include instructions executable by a processor to transmit one or more control messages that indicate a quantity of a set of multiple SRS resource sets configured at a UE, a quantity of one or more SRI fields included in downlink control information, and a quantity of one or more TPMI fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets, transmit a downlink control information message that schedules an uplink shared channel message, the downlink control information message including the one or more SRI fields and the one or more TPMI fields, and receive the uplink shared channel message in accordance with the mapping between the content of the one or more TPMI fields and the quantity of ports associated with the at least one SRS resource from the set of multiple SRS resource sets.

In some examples of the method, apparatuses, and non-transitory computer-readable medium described herein, transmitting the downlink control information message may include operations, features, means, or instructions for generating the one or more TPMI fields in accordance with the mapping indicated by the quantity of the set of multiple maximum rank values and the configured values of the set of one or more maximum number of ports values, where the one or more TPMI fields indicate up to a quantity of ports for each SRS resource indicated by the one or more SRI fields.

In some examples of the method, apparatuses, and non-transitory computer-readable medium described herein, transmitting the one or more control messages may include operations, features, means, or instructions for transmitting an indication of a configuration associated with the set of multiple maximum rank values, where the configuration may be either a first configuration or a second configuration, where the first configuration indicates that, if the uplink shared channel message may be associated with a single SRS resource set, a maximum quantity of ports associated with the uplink shared channel message may be equal to a larger between a first maximum quantity of ports of a first SRS resource and a second maximum quantity of ports of a second SRS resource, and the second configuration indicates that, if the uplink shared channel message may be associated with the single SRS resource set, the maximum quantity of ports associated with the uplink shared channel message may be equal to a summation of the first maximum quantity of ports of the first SRS resource and the second maximum quantity of ports of the second SRS resource.

Some examples of the method, apparatuses, and non-transitory computer-readable medium described herein may further include operations, features, means, or instructions for receiving, via a capability report, information associated with the maximum quantity of ports the UE may be capable of supporting when the uplink shared channel message may be associated with the single SRS resource set, or when the uplink shared channel message may be associated with multiple SRS resource sets, or both.

In some examples of the method, apparatuses, and non-transitory computer-readable medium described herein, transmitting the one or more control messages that indicate the set of multiple maximum rank values and the one or more maximum number of ports values may include operations, features, means, or instructions for transmitting an indication of a respective maximum rank value for each respective SRS resource set of the set of multiple SRS resource sets configured at the UE and transmitting an indication of a respective maximum number of ports value for each respective SRS resource set of the set of multiple SRS resource sets.

In some examples of the method, apparatuses, and non-transitory computer-readable medium described herein, the set of multiple maximum rank values includes a first maximum rank value associated with a first SRS resource set and a second maximum rank value associated with a second SRS resource set, the one or more maximum number of ports values includes a first maximum number of ports value associated with a first SRS resource indicated from the first SRS resource set and a second maximum number of ports value associated with a second SRS resource indicated from the second SRS resource set, and the mapping indicates that a first TPMI field indicates a first rank value less than or equal to the first maximum rank value and indicates a first quantity of ports less than the first maximum number of ports value associated with the first SRS resource if a first codepoint associated with the first SRS resource set may be included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set may be included in the SRS resource set indicator field of the downlink control information message; and the first TPMI field and the second TPMI field each indicate respective ranks that may be less than or equal to the first maximum rank value and the second maximum rank value, respectively, and indicate respective quantities of ports that may be less than or equal to the first maximum number of ports value and the second maximum rank value, respectively, if a third codepoint associated with both the first SRS resource set and the second SRS resource set may be included in the SRS resource set indicator field of the downlink control information message.

In some examples of the method, apparatuses, and non-transitory computer-readable medium described herein, transmitting the one or more control messages that indicate the set of multiple maximum rank values may include operations, features, means, or instructions for transmitting an indication of a baseline maximum rank value and a baseline maximum number of ports value that may be applicable to any one or more of the set of multiple SRS resource sets or any one or more SRS resources, respectively, when the uplink shared channel message may be associated with a single SRS resource set, transmitting an indication of a respective set of one or more maximum rank values for each respective SRS resource set of the set of multiple SRS resource sets, where the respective set of one or more maximum rank values for each respective SRS resource set may be applicable to that respective SRS resource set when the uplink shared channel message may be associated with at least two SRS resource sets, and where the baseline maximum rank value may be less than or equal to a summation of the respective set of one or more maximum rank values for each respective SRS resource set of the set of multiple SRS resource sets, and transmitting an indication of a respective set of one or more maximum number of ports values for each respective SRS resource set of the set of multiple SRS resource sets, where the respective set of one or more maximum number of ports values for each respective SRS resource set may be applicable to that respective SRS resource set when the uplink shared channel message may be associated with the at least two SRS resource sets, and where the baseline maximum number of ports value may be less than or equal to a summation of the respective set of one or more maximum number of ports values for each respective SRS resource from the set of multiple SRS resource sets.

In some examples of the method, apparatuses, and non-transitory computer-readable medium described herein, a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set may be included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set may be included in the SRS resource set indicator field of the downlink control information message; and the first TPMI field and the second TPMI field indicate respective ranks that may be less than or equal to the first maximum rank value and the second maximum rank value, respectively, and indicate respective quantities of ports that may be less than or equal to the first maximum number of ports value and the second maximum number of ports value, respectively, if a third codepoint associated with both the first SRS resource set and the second SRS resource set may be included in the SRS resource set indicator field of the downlink control information message.

In some examples of the method, apparatuses, and non-transitory computer-readable medium described herein, the set of multiple maximum rank values includes the baseline maximum rank value that may be applicable to both a first SRS resource set and a second SRS resource set, a first maximum rank value that may be applicable to the first SRS resource set, and a second maximum rank value that may be applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set may be included in a single SRI field; the single TPMI field indicates a second rank less than or equal to the baseline maximum rank value and indicates a second quantity of ports less than or equal to the baseline maximum number of ports value if an optional second codepoint associated with the second SRS resource set may be included in the single SRI field; and the single TPMI field indicates two ranks that may be less than or equal to the first maximum rank value and the second maximum rank value, respectively, and indicates two quantities of ports that may be less than or equal to the first maximum number of ports value and the second maximum number of ports value, respectively, if a third codepoint associated with both the first SRS resource set and the second SRS resource set may be included in the single SRI field.

In some examples of the method, apparatuses, and non-transitory computer-readable medium described herein, the set of multiple maximum rank values includes the baseline maximum rank value that may be applicable to both a first SRS resource set and a second SRS resource set, a first maximum rank value that may be applicable to the first SRS resource set, and a second maximum rank value that may be applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set may be included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set may be included in the joint field; and the joint field indicates the first SRS resource and the second SRS resource, two ranks that may be less than or equal to the first maximum rank value and the second maximum rank value, respectively, and two quantities of ports that may be less than or equal to the first maximum number of ports value and the second maximum number of ports value, respectively, if a third codepoint associated with both the first SRS resource set and the second SRS resource set may be included in the joint field.

In some examples of the method, apparatuses, and non-transitory computer-readable medium described herein, the set of multiple maximum rank values includes the baseline maximum rank value that may be applicable to one or both of a first SRS resource set and a second SRS resource set, a first maximum rank value that may be applicable to a third SRS resource set, and a second maximum rank value that may be applicable to a fourth SRS resource set, the one or more maximum number of ports values includes the baseline maximum number of ports value that may be applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set may be included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set may be included in the SRS resource set indicator field of the downlink control information message; and the first TPMI field and the second TPMI field indicate respective ranks that may be less than or equal to the first maximum rank value and the second maximum rank value, respectively, and indicate respective quantities of ports that may be less than or equal to the first maximum number of ports value and the second maximum number of ports value, respectively, if a third codepoint associated with both the third SRS resource set and the fourth SRS resource set may be included in the SRS resource set indicator field of the downlink control information message.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, the set of multiple maximum rank values includes the baseline maximum rank value that may be applicable to one or both of a first SRS resource set and a second SRS resource set, a first maximum rank value that may be applicable to a third SRS resource set, and a second maximum rank value that may be applicable to a fourth SRS resource set, the one or more maximum number of ports values includes the baseline maximum number of ports value that may be applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set may be included in a single SRI field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set may be included in the single SRI field of the downlink control information message; and the single TPMI field indicates two ranks that may be less than or equal to the first maximum rank value and the second maximum rank value, respectively, and two quantities of ports that may be less than or equal to the first maximum number of ports value and the second maximum number of ports value, respectively, if a third codepoint associated with both the third SRS resource set and the fourth SRS resource set may be included in the single SRI field of the downlink control information message.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, the set of multiple maximum rank values includes the baseline maximum rank value that may be applicable to one or both of a first SRS resource set and a second SRS resource set, a first maximum rank value that may be applicable to a third SRS resource set, and a second maximum rank value that may be applicable to a fourth SRS resource set, the one or more maximum number of ports values includes the baseline maximum number of ports value that may be applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a joint field indicates an SRS resource from the first SRS resource set, a first rank less than or equal to the baseline maximum rank value, and a first quantity of ports less than or equal to the baseline maximum number of ports value if a first codepoint associated with the first SRS resource set may be included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set may be included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set may be included in the joint field.

In some examples of the method, apparatuses, and non-transitory computer-readable medium described herein, the first SRS resource set and the second SRS resource set may be exclusively configured for when the uplink shared channel message may be associated with the single SRS resource set, and the third SRS resource set and the fourth SRS resource set may be exclusively configured for when the uplink shared channel message may be associated with at least two SRS resource sets.

In some examples of the method, apparatuses, and non-transitory computer-readable medium described herein, each maximum rank value of the set of multiple maximum rank values may be indicated per SRS resource set, per downlink control information format, per bandwidth part, or per component carrier.

In some examples of the method, apparatuses, and non-transitory computer-readable medium described herein, transmitting the uplink shared channel message in accordance with the mapping may include operations, features, means, or instructions for transmitting the uplink shared channel message using one or more spatial domain filters corresponding to the one or more TPMI fields.

In some examples of the method, apparatuses, and non-transitory computer-readable medium described herein, the downlink control information message indicates a dynamic switch between single transmission and reception point (TRP) operation and multi-TRP operation.

BRIEF DESCRIPTION OF THE DRAWINGS

FIGS. 15 and 16 show flowcharts illustrating methods that support techniques for interpreting DCI fields in codebook-based multi-panel deployments with dynamic panel switching in accordance with one or more aspects of the present disclosure.

DETAILED DESCRIPTION

Figure 1:
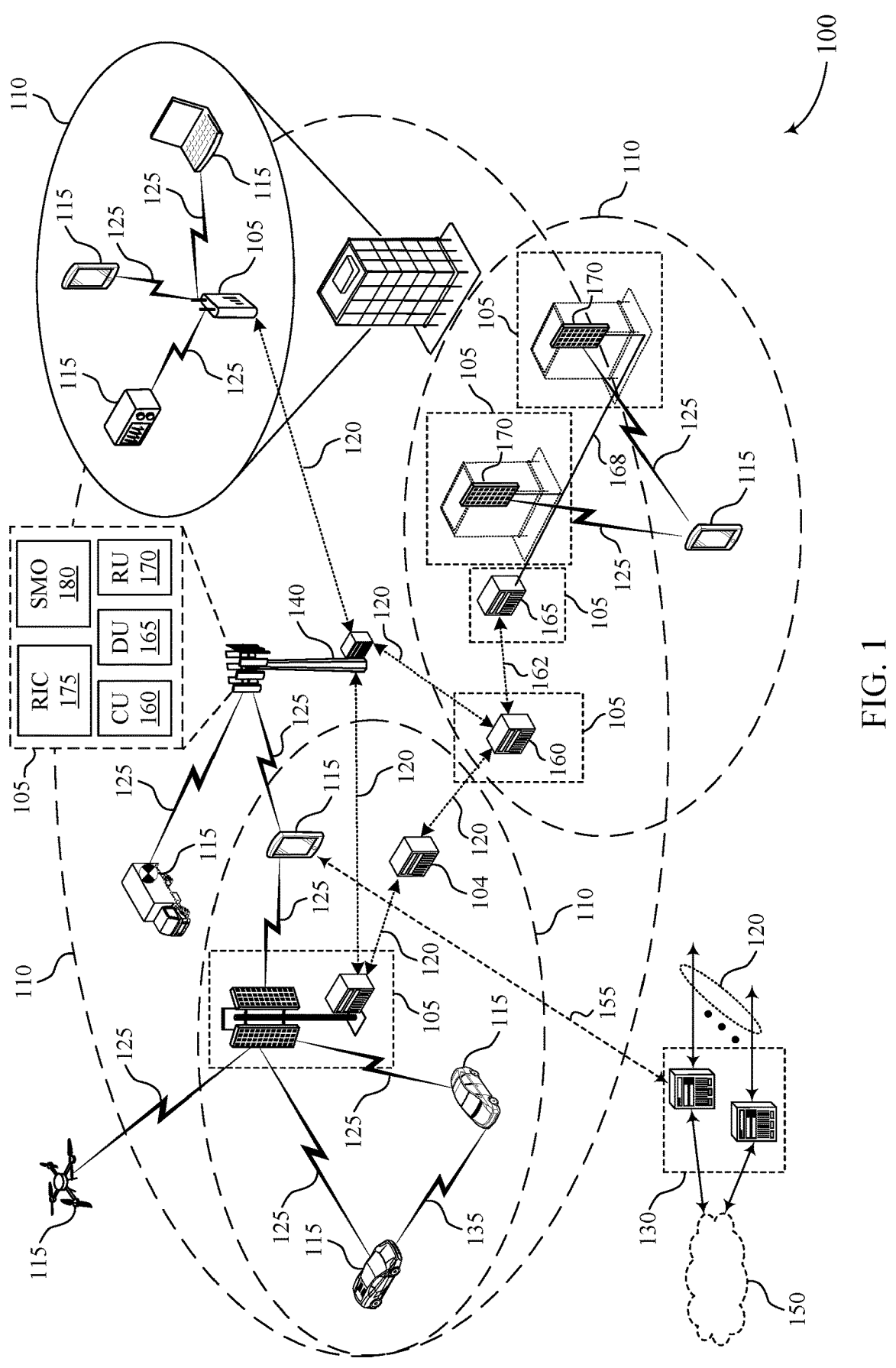
FIG. 1 shows an example of a wireless communications system that supports techniques for interpreting downlink control information (DCI) fields in codebook-based multi-panel deployments with dynamic panel switching in accordance with one or more aspects of the present disclosure.

In some wireless communications systems, a network entity may dynamically schedule an uplink shared channel, such as a physical uplink shared channel (PUSCH), message from a user equipment (UE) via a downlink control information (DCI) message. Such a DCI message may be referred to herein as a scheduling DCI, and may indicate information associated with the PUSCH message to be transmitted from the UE. Such information may include beamforming or panel information and may indicate whether a transmission is a single transmission and reception point (TRP, such as sTRP) transmission or a multi-TRP (mTRP) transmission, and may be indicated or conveyed via an indication of one or more sounding reference signal (SRS) resources. Further, the information indicated by the DCI message may vary in accordance with whether the PUSCH message is associated with a codebook (CB)-based PUSCH transmission or a non-CB-based PUSCH transmission. For example, for CB-based PUSCH transmissions, the DCI message may indicate a codepoint via an SRS resource set indicator field and a transmit precoding matrix indicator (TPMI) field may indicate information associated with a quantity of PUSCH ports can be selected from a set of ports associated with an indicated SRS resource. The UE may use the TPMI field to select how many layers and a precoder to use for the PUSCH message.

Further, a UE may support, at a given time, one of various different configurations relating to how many layers the UE may use for the PUSCH message. In some scenarios, for example, if the UE may transmit up to (X1, X2) layers in a simultaneous transmission with multiple panels (STxMP) deployment (where the X1 layers may be associated with a first SRS resource set and the X2 layers may be associated with a second SRS resource set, simultaneously), the UE may transmit up to a greater of the X1 layers and the X2 layers in sTRP operation in accordance with a first configuration. Similarly, if a UE can transmit with up to (P1, P2) PUSCH ports in STxMP, the UE may transmit with up to max(P1, P2) PUSCH ports in sTRP in accordance with the first configuration. In some other scenarios, if the UE may transmit up to (X1, X2) layers in an STxMP deployment, the UE may transmit up to X1+X2 layers in sTRP operation in accordance with a second configuration. Similarly, if a UE can transmit with up to (P1, P2) PUSCH ports in STxMP, the UE may transmit with up to P1+P2 PUSCH ports in sTRP in accordance with the second configuration.

While both configurations may be valid UE implementations, some systems may lack maxRank and maximum number of ports configurations and DCI-interpretation rules according to which a UE may obtain information associated with a scheduled PUSCH message in compliance with one or both of the first configuration and the second configuration. As such, a network entity may be unable to dynamically schedule a UE with an sTRP or mTRP PUSCH message with guaranteed compliance with one or both of the first configuration and the second configuration.

In some implementations, a UE and a network entity may support one or more configuration- or signaling-based mechanisms according to which the network entity may configure one or more maxRank values and one or more maximum number of ports values in accordance with the first configuration or the second configuration and according to which the UE may interpret one more DCI fields to identify, ascertain, or otherwise determine information associated with an sTRP or mTRP PUSCH message. For example, in scenarios in which the UE is configured in accordance with the first configuration, the network entity may configure one maxRank value and one maximum number of ports value for each SRS resource set (e.g., X1 and P1 for a first SRS resource set and X2 and P2 for a second SRS resource set) that is applicable regardless of whether sTRP operation or mTRP operation is indicated. Alternatively, in scenarios in which the UE is configured in accordance with the second configuration, the network entity may configure a baseline maxRank value (e.g., X) and a baseline (such as a first) maximum number of ports value (e.g., P) that is applicable when sTRP operation is indicated and one or more additional maxRank values and maximum number of ports values for each SRS resource set (e.g., X1 and P1 for a first SRS resource set and X2 and P2 for a second SRS resource set) that are applicable when mTRP operation is indicated. Further, the UE may support a specific mapping or interpretation of DCI fields in accordance with whether the UE receives an indication of the first configuration or the second configuration.

Particular implementations of the subject matter described in this disclosure can be implemented to realize one or more of the following potential advantages. For example, in accordance with supporting an indication (which may be explicit or implicit based on how many maxRank values and maximum number of ports values are configured or indicated for each SRS resource set) of the first configuration or the second configuration and a specific mapping or interpretation of DCI fields in accordance with whether the UE receives an indication of the first configuration or the second configuration, the UE and the network entity may support more reliable indications of sTRP operation and mTRP operation while satisfying the maxRank and maximum number of ports constraints associated with the first configuration or the second configuration. In accordance with such greater reliability, the UE and the network entity may experience lower latency and more flexible or dynamic scheduling opportunities. Accordingly, the UE and the network entity may experience higher data rates, greater spectral efficiency, and facilitate greater system capacity, among other benefits.

Aspects of the disclosure are initially described in the context of wireless communications systems. Aspects of the disclosure are additionally illustrated by and described with reference to a signaling diagram, multi-panel simultaneous transmission schemes, an SRS resource port selection procedure, and a process flow. Aspects of the disclosure are further illustrated by and described with reference to apparatus diagrams, system diagrams, and flowcharts that relate to techniques for interpreting DCI fields in codebook-based multi-panel deployments with dynamic panel switching.

FIG. 1 illustrates an example of a wireless communications system 100 that supports techniques for interpreting DCI fields in codebook-based multi-panel deployments with dynamic panel switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for interpreting DCI fields in codebook-based multi-panel deployments with dynamic panel switching as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, such as the wireless communications system 100, a network entity 105 may dynamically schedule an uplink share channel, such as a PUSCH, message from a UE 115 via a DCI message. Such a DCI message may be referred to herein as a scheduling DCI, and may indicate information associated with the PUSCH message to be transmitted from the UE. Such information may include beamforming or panel information and may indicate whether a transmission is an sTRP or an mTRP transmission, and may be indicated or conveyed via an indication of one or more SRS resources. Further, the information indicated by the DCI message may vary in accordance with whether the PUSCH message is associated with a CB-based PUSCH transmission or a non-CB-based PUSCH transmission.

For example, for a CB-based PUSCH transmission, a UE 115 may be configured with one SRS resource set with "usage" set or configured to "codebook." A maximum or upper limit of four SRS resources with the SRS resource set with "usage" set to "codebook" may be configured for a UE 115 and each SRS resource may be configured, such as RRC-configured, with a number or quantity of ports (such as via an nroISRS-Ports parameter). Further, an SRI field in an uplink DCI (e.g., a DCI scheduling a PUSCH) may indicate one SRS resource. A quantity of ports configured for the indicated SRS resource may inform, indicate, imply, or otherwise assist a UE 115 in determining or selecting a quantity of antenna ports for a scheduled PUSCH. A UE 115 may transmit the scheduled PUSCH using a same spatial domain filter (e.g., a same uplink beam or directional configuration) as the indicated SRS resources. A UE 115 may determine or select a quantity of layers (e.g., a rank) and a transmit precoding matrix indicator (TPMI) (e.g., a pre-coder) for the scheduled PUSCH from or using a separate DCI field, such as a "precoding information and number of layers" field.

For a non-CB-based PUSCH transmission, a UE 115 may be configured with one SRS resource set with "usage" set or configured to "noncodebook." A maximum or upper limit of four SRS resources within the SRS resource set with "usage" set to "noncodebook" may be configured for a UE 115 and each SRS resource may have or otherwise be associated with one port. An SRI field in an uplink DCI (e.g., a DCI scheduling a PUSCH) may indicate one or multiple SRS resources. A number or quantity of indicated SRS resources may inform, indicate, imply, or otherwise assist a UE 115 in determining or selecting a rank (e.g., a number or quantity of layers) for a scheduled PUSCH and the UE 115 may transmit the scheduled PUSCH using a same precoder as well as a same spatial domain filter (e.g., precoder) as the indicated SRS resources.

For both CB-based PUSCH transmissions and non-CB-based PUSCH transmissions, a size of an SRI field may be a function of a quantity of SRS resources within the applicable SRS resource set. For example, a size of an SRI field for non-CB-based PUSCH transmissions may be defined in accordance with Table 1 if a higher layer parameter of txConfig is set equal to nonCodebook, where $N_{SRS}$ may be a number or quantity of configured SRS resources in an SRS resource set configured by higher layer parameters srs-ResoureSetToAddModList, and associated with the higher layer parameter usage of value 'nonCodeBook.' The size of the SRI field may be $$\left\lceil \log_2\left( \sum\nolimits_{k=1}^{min\{L_{max}, N_{SRS}\}} (N_{SRS}) \right) \right\rceil \text{ bits.}$$

TABLE 1

SRI Indication for Non-CB-based PUSCH Transmission, $L_{max} = 4$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14 | 0, 1, 2, 3 |
| | | | | 15 | reserved |

Further, a size of an SRI field for CB-based PUSCH transmissions may be defined in accordance with Table 2 if the higher layer parameter txConfig is set equal to codebook, where $N_{SRS}$ may be a number or quantity of configured SRS resources in an SRS resource set configured by higher layer parameters srs-ResoureSetToAddModList, and associated with the higher layer parameter usage of value 'codeBook.' The size of the SRI field may be $\lceil \log_2(N_{SRS}) \rceil$ bits.

TABLE 2

SRI indication for codebook based PUSCH transmission, if ul-FullPowerTransmission = fullpowerMode2 and $N_{SRS} = 4$

| Bit field mapped to index | SRI(s), $N_{SRS} = 4$ |
|---|---|
| 0 | 0 |
| 1 | 1 |
| 2 | 2 |
| 3 | 3 |

For each pair of (#of layers, #of PUSCH ports), a set of precoding matrices may be defined or supported with corresponding TPMI indices. Example matrices for the pair of (#of layers, #of PUSCH ports)=(1, 4), (2, 2), and (3, 4) are shown below with reference to Table 3, Table 4, and Table 5, respectively.

TABLE 3

Precoding Matrix W for Single-Layer Transmission Using Four
Antenna Ports with Transform Precoding Disabled

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 4

Precoding Matrix W for Two-Layer Transmission Using Two
Antenna Ports with Transform Precoding Disabled

| TPMI index | W (ordered from left to right in increasing order of TPMI index) |
|---|---|
| 0-2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

TABLE 5

Precoding matrix W for three-layer transmission using four
antenna ports with transform precoding disabled

| TPMI index | W (ordered from left to right in increasing order of TPMI index) |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ $\frac{1}{2\sqrt{3}}\begin{bmatrix}1&1&1\\-1&1&-1\\1&1&-1\\-1&1&1\end{bmatrix}$ $\frac{1}{2\sqrt{3}}\begin{bmatrix}1&1&1\\-1&1&-1\\j&j&-j\\-j&j&j\end{bmatrix}$ — |

For CB-based PUSCH transmissions, a TPMI index may be indicated in a DCI field "precoding information and number of layers." Tables 6, 7, 8, and 9 provide additional information for a case in which FullpowerModel is not configured. As illustrated by Tables 6, 7, 8, and 9, different Tables may correspond to different quantities of antenna ports or different maximum ranks (e.g., different maxRank values).

TABLE 6

Precoding information and number of layers, for 4 antenna ports, if transform precoder is disabled, maxRank = 2 or 3 or 4, and ul-FullPowerTransmission is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = NonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | . . . | . . . |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| . . . | . . . | | | | |
| 47 | 1 layers: TPMI = 27 | | | | |
| 48 | 2 layers: TPMI = 14 | | | | |
| . . . | . . . | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 7

Precoding Information and Number of Layers for 4 antenna ports, if transform precoder is enabled and ul-FullPowerTransmission is either not configured or configured to fullpowerMode2, or if transform precoder is disabled, maxRank = 1, and ul-FullPowerTransmission is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = NonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| . . . | . . . | . . . | . . . | | |
| 4 | 1 layer: TPMI = 4 | 4 | 1 layer: TPMI = 4 | | |
| . . . | . . . | . . . | . . . | | |
| 11 | 1 layer: TPMI = 11 | 11 | 1 layer: TPMI = 11 | | |
| 12 | 1 layer: TPMI = 12 | 12-15 | Reserved | | |
| . . . | . . . | | | | |
| 27 | 1 layer: TPMI = 27 | | | | |
| 28-31 | reserved | | | | |

TABLE 8

Precoding Information and Number of Layers, for 2 antenna ports,
if transform precoder is disabled, maxRank = 2, and
ul-FullPowerTransmission is not configured or configured
to fullpowerMode2 or configured to fullpower

| Bit field mapped to index | codebookSubset = fully AndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 0 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 9

Precoding Information and Number of Layers, for 2 antenna ports, if
transform precoder is enabled and ul-FullPowerTransmission is not
configured or configured to fullpowerMode2 or configured to fullpower,
or if transmission precoder is disabled, maxRank = 1, and
ul-FullPowerTransmission is no tconfigured or configured to
fullpowerMode2 or configured to fullpower

| Bit field mapped to index | codebookSubset = fully AndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

In some aspects, a UE 115 and a network entity 105 may support a TPMI field bitwidth and maximum quantity of ports. For example, for the higher layer parameter txConfig=codebook, if ul-FulP ow erTransmission is configured to fullpowerMode2, maxRank may be configured to be larger than 2, and at least one SRS resource with 4 antenna ports may be configured in an SRS resource set with usage set to 'codebook' and an SRS resource with 2 antenna ports may be indicated via SRI in a same SRS resource set, Table 7 may be used. For the higher layer parameters txConfig=codebook, if different SRS resources with different quantities of antenna ports are configured, a bitwidth may be determined according to a maximum number of ports in an SRS resource among the configured SRS resources in an SRS resource set with usage set to 'codebook.' If the quantity of ports for a configured SRS resource in the set is less than the maximum number of ports in an SRS resource among the configured SRS resources, a set of most significant bits with value set to '0' may be inserted to the field. Accordingly, a UE 115 and a network entity 105 may assume, for an SRS resource set, if a maximum number of ports is $p_{max}$ and, for an indicated SRS resource, the quantity of ports is p, the TPMI field size may be determined according to $p_{max}$ the actual Table to use may be determined according to p, and the quantity of PUSCH ports may be equal to the quantity (e.g., number) of ports p for the indicated SRS resource.

Further, a UE 115 may support, at a given time, one of various different configurations relating to how many layers the UE 115 may use for the PUSCH message. In some scenarios, for example, if the UE 115 may transmit up to (X1, X2) layers in a simultaneous transmission with multiple panels (STxMP) deployment (where the X1 layers may be associated with a first SRS resource set and the X2 layers may be associated with a second SRS resource set, simultaneously), the UE 115 may transmit up to a greater of the X1 layers and the X2 layers in sTRP operation in accordance with a first configuration. In some other scenarios, if the UE 115 may transmit up to (X1, X2) layers in an STxMP deployment, the UE 115 may transmit up to X1+X2 layers in sTRP operation in accordance with a second configuration. While both configurations may be valid UE implementations, some systems may lack maxRank configurations and DCI-interpretation rules according to which a UE 115 may obtain information associated with a scheduled PUSCH message in compliance with one or both of the first configuration and the second configuration. As such, a network entity 105 may be unable to dynamically schedule a UE 115 with an sTRP or mTRP PUSCH message with guaranteed compliance with one or both of the first configuration and the second configuration.

In some implementations, a UE and a network entity may support one or more configuration- or signaling-based mechanisms according to which the network entity may configure one or more maxRank values and one or more maximum number of ports values in accordance with the first configuration or the second configuration and according to which the UE may interpret one more DCI fields to identify, ascertain, or otherwise determine information associated with an sTRP or mTRP PUSCH message. For example, in scenarios in which the UE is configured in accordance with the first configuration, the network entity may configure one maxRank value and one maximum number of ports value for each SRS resource set (e.g., X1 and P1 for a first SRS resource set and X2 and P2 for a second SRS resource set) that is applicable regardless of whether sTRP operation or mTRP operation is indicated. Alternatively, in scenarios in which the UE is configured in accordance with the second configuration, the network entity may configure a baseline maxRank value (e.g., X) and a baseline maximum number of ports value (e.g., P) that is applicable when sTRP operation is indicated and one or more additional maxRank values and maximum number of ports values for each SRS resource set (e.g., X1 and P1 for a first SRS resource set and X2 and P2 for a second SRS resource set) that are applicable when mTRP operation is indicated.

Further, the UE 115 may support a specific mapping or interpretation of DCI fields in accordance with whether the UE 115 receives an indication of the first configuration or the second configuration. Additional details relating to such mappings or interpretations that a UE 115 may apply to one or more DCI fields are illustrated by and described in more detail with reference to FIG. 2.

Figure 2:
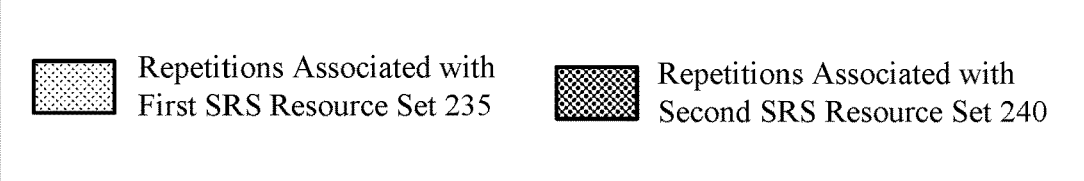
FIG. 2 shows an example signaling diagram that supports techniques for interpreting DCI fields in codebook-based multi-panel deployments with dynamic panel switching in accordance with one or more aspects of the present disclosure.

FIG. 2 shows an example signaling diagram 200 that supports techniques for interpreting DCI fields in codebook-based multi-panel deployments with dynamic panel switching in accordance with one or more aspects of the present disclosure. The signaling diagram 200 may implement or be implemented to realize or facilitate aspects of the wireless communications system 100. For example, the signaling diagram 200 illustrates communication between a UE 115 and a network entity 105 via a TRP 205-a or a TRP 205-b, or both. The UE 115, the network entity 105, the TRP 205-a, and the TRP 205-b may be examples of corresponding devices illustrated by and described with reference to FIG.

1. In some implementations the UE 115 and the network entity 105 may support a dynamic switching between sTRP operation and mTRP operation at the UE 115 in accordance with specific configurations of one more maxRank values and a specific mapping or interpretation rule that the UE 115 may use when receiving, decoding, or interpreting scheduling DCI from the network entity 105.

The UE 115 and the network entity 105 may communicate via an uplink 210 via which the UE 115 may transmit signaling to one or both of the TRP 205-*a* and the TRP 205-*b* and a downlink 215 via which the UE 115 may receive signaling from one or both of the TRP 205-*a* and the TRP 205-*b*. In some implementations, the UE 115 and the network entity 105 may support single-DCI based PUSCH repetition in a TDM manner corresponding to different transmission parameters (such as different beam or spatial relation parameters, different power control parameters, or different precoding parameters, or any combination thereof) indicated to or configured at the UE 115. In some aspects, PUSCH repetitions may be scheduled by a single DCI may belong to two sets, where each set may have a respective precoding beam (e.g., a respective TCI state or spatial relation) or respective power control parameters, or any combination thereof. To facilitate such separate sets of PUSCH repetitions, the UE 115 and the network entity 105 may associate separate sets of PUSCH repetitions to separate SRS resource sets.

For example, for CB-based PUSCH transmissions, DCI may indicate two precodings, two beams, or two sets of power control parameters, or any combination thereof, by two corresponding SRI fields for CB-based. The two SRI fields may each indicate one SRS resource from a corresponding SRS resource set. Further, a same quantity of PUSCH ports may be indicated by the two SRI fields. In other words, the two indicated SRS resources may have a same quantity of SRS ports. Further, for CB-based PUSCH transmissions, DCI may include two TPMI fields. A first TPMI field may indicate a first TPMI index and a quantity of layers and a second TPMI field (of smaller size) may indicate a second TPMI index (where a quantity of layers associated with the second TPMI field is based on, or equal to, the quantity of layers indicated by the first TPMI field).

For example, an uplink DCI may schedule a set of four PUSCH repetitions and separated into two sets of PUSCH repetitions, each targeted for a different TRP 205. For example, a first PUSCH repetition and a third PUSCH repetition may be associated with a first SRS resource set and correspondingly a first TPMI, a first precoding, a first beam, a first set of power control parameters, or any combination thereof, and may be targeted or oriented toward a first TRP (such as the TRP 205-*a*). A second PUSCH repetition and a third PUSCH repetition may be associated with a second SRS resource set and correspondingly a second TPMI, a second precoding, a second beam, a second set of power control parameters, or any combination thereof, and may be targeted or oriented toward a second TRP (such as the TRP 205-*b*).

In some implementations, the UE 115 and the network entity 105 may support a dynamic switching between mTRP and sTRP based on DCI fields of specific DCI formats. For example, the UE 115 and the network entity 105 may use an "SRS resource set indicator" field of a DCI format 0_1 and a DCI format 0_2 to convey four codepoints 245, where different codepoints 245 indicate (dynamically) different sTRP communication modes and different mTRP communication modes. For example, a codepoint 245-*a* may indicate sTRP operation using PUSCH repetitions associated with a first SRS resource set 235, a codepoint 245-*b* may indicate sTRP operation using PUSCH repetitions associated with a second SRS resource set 240, a codepoint 245-*c* may indicate a first sequence of both PUSCH repetitions associated with a first SRS resource set 235 and PUSCH repetitions associated with a second SRS resource set 240, and a codepoint 245-*d* may indicate a second sequence of both PUSCH repetitions associated with a first SRS resource set 235 and PUSCH repetitions associated with a second SRS resource set 240. Generally, the UE 115 may interpret the codepoints 245 indicted by DCI in accordance with Table 10 below.

TABLE 10

| | SRS Resource Set Indicator Field | | | |
|---|---|---|---|---|
| Codepoint | SRS resource set(s) | SRI | # of PUSCH ports (p) | TPMI and rank |
| 00 | s-TRP mode with 1$^{st}$ SRS resource set (TRP1) | 1$^{st}$ SRI field: indicates one SRS resource from the 1$^{st}$ SRS resource set | # of ports of the indicated SRS resource | 1$^{st}$ TPMI field: Indicate a rank r (r <= X) and a TPMI index (with p. PUSCH ports and r layers) 2$^{nd}$ TPMI field: Unused. |
| 01 | s-TRP mode with 2$^{nd}$ SRS resource set (TRP2) | 2$^{nd}$ SRI field: indicates one SRS resource from the 2$^{nd}$ SRS resource set | # of ports of the indicated SRS resource | 1$^{st}$ TPMI field: Indicate a rank r (r <= X) and a TPMI index (with p. PUSCH ports and r layers) 2$^{nd}$ TPMI field: Unused. |
| 10 | TDM mode with (TRP1, TRP2 order) 1$^{st}$ SRI/TPMI field: 1$^{st}$ SRS resource set 2$^{nd}$ SRI/TPMI field: 2$^{nd}$ SRS resource set | 1$^{st}$ SRI field: indicates one SRS resource from the 1$^{st}$ SRS resource set 2$^{nd}$ SRI field: indicates one SRS resource from the 2$^{nd}$ SRS resource set | # of ports of the first/ second indicated SRS resource, which has to be the same | 1$^{st}$ TPMI field: Indicate a rank r (r <= X) and a TPMI index (with p. PUSCH ports and r layers) 2$^{nd}$ TPMI field: Indicate a TPMI index (with p. PUSCH ports and r layers), but does not indicate a rank (same rank r as indicated by the first TPMI field is assumed) |

TABLE 10-continued

| | SRS Resource Set Indicator Field | | | |
|---|---|---|---|---|
| Codepoint | SRS resource set(s) | SRI | # of PUSCH ports (p) | TPMI and rank |
| 11 | TDM mode with (TRP2, TRP1 order) $1^{st}$ SRI/TPMI field: $1^{st}$ SRS resource set $2^{nd}$ SRI/TPMI field: $2^{nd}$ SRS resource set | $1^{st}$ SRI field: indicates one SRS resource from the $1^{st}$ SRS resource set $2^{nd}$ SRI field: indicates one SRS resource from the $2^{nd}$ SRS resource set | # of ports of the first/ second indicated SRS resource, which has to be the same | $1^{st}$ TPMI field: Indicate a rank r (r <= X) and a TPMI index (with p. PUSCH ports and r layers) $2^{nd}$ TPMI field: Indicate a TPMI index (with p. PUSCH ports and r layers), but does not indicate a rank (same rank r as indicated by the first TPMI field is assumed) |

In some deployments, the UE 115 and the network entity 105 may support various configurations relating to how many layers the UE 115 can use for a PUSCH transmission. For example, two different cases or configurations may be considered in STxMP (applicable at least to SDM, FDM, or SFN schemes) with respect to dynamic switching between STxMP and sTRP. In a first case or configuration, if the UE 115 can transmit up to (X1, X2) layers in STxMP (X1 layers associated with first SRS resource set, and X2 layers associated with the second SRS resource set, simultaneously), the UE 115 may transmit up to a max(X1, X2) layers in sTRP (associated with one SRS resource set). Additionally, in the first case or configuration, if the UE 115 can transmit with up to (P1, P2) PUSCH ports in STxMP, the UE 115 may transmit with up to max(P1, P2) PUSCH ports in sTRP. In a second case or configuration, if the UE 115 can transmit up to (X1, X2) layers in STxMP, the UE 115 may transmit up to X1+X2 layers in sTRP. Additionally, in the second case or configuration, if the UE 115 can transmit with up to (P1, P2) PUSCH ports in STxMP, the UE 115 may transmit with up to P1+P2 PUSCH ports in sTRP.

For one or both cases or configurations, some examples cases may include X1=X2, or P1=P2, among other examples. In accordance with such examples, the first configuration and the second configuration may be further described in accordance with Table 11, shown below.

In some systems, however, allowing for the second configuration may be incompatible with some interpretation rules at the UE 115. For example, in an STxMP mode, a maximum quantity of layers associated with a given SRS resource set may be smaller than the maximum quantity of layers associated with a same SRS resource set in an sTRP mode. Likewise, a quantity of SRS resources that may be indicated from a given SRS resource set may be larger in case of sTRP operation (where a single SRS resource set is indicted) compared to SDM/FDM/SFN schemes (where two SRS resource sets are indicated). Due to such potential variation in quantity of layers that may be indicated between sTRP and mTRP operation modes, allowing both the first configuration and the second configuration (both of which may be valid UE implementations) may result in ambiguity at the UE 115 and the network entity 105 in terms of how many layers the UE 115 is to use for a given PUSCH transmission.

Accordingly, in some implementations of the present disclosure, the UE 115 and the network entity may support one or more configuration- or signaling-based mechanisms according to which the network entity 105 may configure one or more maxRank values and one or more maximum number of ports values in accordance with the first configuration or the second configuration and according to which the UE 115 may interpret one more DCI fields to identify,

TABLE 11

| | First Configuration vs. Second Configuration | | | | |
|---|---|---|---|---|---|
| | | X1 = X2 = 1 P1 = P2 = 1 | X1 = X2 = 1 P1 = P2 = 2 | X1 = X2 = 1 P1 = P2 = 4 | X1 = X2 = 2 P1 = P2 = 2 | X1 = X2 = 2 P1 = P2 = 4 |
| First Configuration (Case 1) | Layers: (1, 1) in STxMP or 1 in sTRP PUSCH Ports: (1, 1) in STxMP or 1 in sTRP | Layers: (1, 1) in STxMP or 1 in sTRP PUSCH Ports: (2, 2) in STxMP or 2 in sTRP | Layers: (1, 1) in STxMP or 1 in sTRP PUSCH Ports: (4,4 ) in STxMP or 4 in sTRP | Layers: (2, 2) in STxMP or 2 in sTRP PUSCH Ports: (2, 2) in STxMP or 2 in sTRP | Layers: (2, 2) in STxMP or 2 in sTRP PUSCH Ports: (4, 4) in STxMP or 4 in sTRP |
| Second Configuration (Case 2) | Layers: (1, 1) in STxMP or 2 in sTRP PUSCH Ports: (1,1 ) in STxMP or 2 in sTRP | Layers: (1, 1) in STxMP or 2 in sTRP PUSCH Ports: (2, 2) in STxMP or 4 in sTRP | Layers: (1, 1) in STxMP or 2 in sTRP PUSCH Ports: (4, 4) in STxMP or 8 in sTRP | Layers: (2, 2) in STxMP or 4 in sTRP PUSCH Ports: (2, 2) in STxMP or 4 in sTRP | Layers: (2, 2) in STxMP or 4 in sTRP PUSCH Ports: (4, 4) in STxMP or 8 in sTRP | ascertain, or otherwise determine information associated with an sTRP or mTRP PUSCH message. In other words, the UE 115 and the network entity 105 may support dynamic switching between sTRP and STxMP (including SDM, FDM, or SFN PUSCH schemes) for CB-based PUSCH.

In some implementations, the network entity 105 may transmit one or more control messages 220 that indicate (implicitly or explicitly) the first configuration or the second configuration, which may indicate, imply, or may be otherwise associated with how the network entity 105 configures one or more maxRank values, different fields of a DCI message 225 scheduling a PUSCH, how SRS resource set(s) may be indicated, how SRS resource(s) within one or two SRS resource sets may be indicated, or how one or more TPMI indices may be indicated, or any combination thereof. In examples in which the network entity 105 indicates the first configuration to the UE 115, the UE 115 and the network entity 105 may use a first format or interpretation, or both, of the DCI message 225.

For example, the first configuration may indicate or be associated with how an SRS resource set indicator field, how SRI field(s), and TPMI field(s) of the DCI message 225 may be interpreted by the UE 115. In examples in which the network entity 105 indicates the second configuration to the UE 115, the UE 115 and the network entity 105 may use a second format or interpretation, or both, of the DCI message 225. For example, the second configuration may indicate or be associated with one or more of various options for how indications of SRS resource set(s) (e.g., an indication of sTRP mode vs. STxMP mode), one or more various options for how indications of SRS resources(s) within one or two SRS resource sets, and one or more various options for how indications of one or two ranks and one or two TPMI indices may be interpreted by the UE 115. Further, while STxMP modes are largely discussed in the context of an SDM scheme, the described techniques may also be applicable to FDM or SFN schemes.

In some implementations of the first configuration, a value of a max rank may be configured. In some examples, the max rank may be configured via RRC. The RRC-configured max rank may correspond to a quantity of transmission layers related to an SRS resource set irrespective of whether the SRS resource set is indicated alone (e.g., in an sTRP mode) or is indicated together with another SRS resource set (e.g., in an STxMP mode, such as an SDM scheme, an FDM scheme, or an SFN scheme). The max rank configuration may be based per SRS resource set, or per DCI format, per BWP, per CC, or any combination thereof.

For example, the max rank may be configured per SRS resource set. In this example, the max rank value X1, which may correspond to the first SRS resource set 235, may not be the same as max rank value X2, which may correspond to the second SRS resource set 240. The configuration of the max rank in this example may apply to an SDM scheme. In other examples, the max rank may be configured per DCI format, BWP, or CC. In some implementations, the DCI format may be separately configured for DCI format 0_1 compared to DCI format 0_2. In such examples, the max rank values X1 and X2 may be equal. Such examples may apply to SDM, FDM, or SFN schemes. Additionally, or alternatively, all such examples described hereto may apply to non-CB-based PUSCH and CB-based PUSCH.

In some implementations of the second configuration, a first value of a max rank, X, may be configured. The max rank value may be configured via RRC and may be applicable in implementations of a single SRS resource set is associated with the PUSCH (e.g., sTRP mode). In some cases, one or more values of max rank (e.g., X1, X2) may be RRC-configured. The one or more values of max rank may be applicable in implementations where at least two SRS resource sets are associated with the PUSCH simultaneously (e.g., STxMP mode, i.e., SDM, FDM, SFN schemes).

In some cases, the configuration of the second one or more max rank (X1, X2) may be per SRS resource set. In such cases, X1, from the first SRS resource set 235, may not be the same max rank X2, from the second SRS resource set 240. In these cases, the configuration may be applicable to SDM schemes. In other cases, the configuration of the second or more max rank (X1, X2) may be per DCI format, BWP, CC, or any combination thereof. In some implementations, the DCI format may be separately configured for DCI format 0_1 compared to DCI format 0_2. In such cases, max rank X1 may equal max rank X2. In these cases, the configuration may be applicable to SDM, FDM, or SFN schemes. Additionally, or alternatively, the UE 115 may receive a configuration such that X≤X1+X2, or X≤2X' when X1=X2=X'. All such cases described hereto may apply to non-CB-based PUSCH (which may be referred to as NCB-based PUSCH) and CB-based PUSCH.

The UE 115 may indicate its capability by indicating a threshold quantity of available PUSCH ports. The threshold quantity of PUSCH ports may be the same as the threshold quantity of SRS ports. Details of the capability of the UE 115 (e.g., with respect to maxRank or max number of layers) corresponding to the first configuration of maxRank values/quantities of PUSCH ports and the second configuration of maxRank values/quantities of PUSCH ports may be additionally supported.

In some implementations, the UE 115 may provide an explicit indication of whether the UE 115 supports the first configuration or the second configuration, or both. The UE 115 may indicate the capability of SRS ports per SRS resource as a threshold quantity P (which is used in s-TRP mode). If the UE 115 supports the first configuration (e.g., for SDM/FDM/SFN schemes), the threshold P may indicate that the UE 115 supports (P, P) PUSCH ports (e.g., simultaneously). If the UE 115 the second configuration, the threshold P may indicate that the UE 115 supports (P/2, P/2) PUSCH ports (e.g., simultaneously).

In some other implementations, the UE may indicate its capability of threshold quantity of SRS ports per SRS resource (e.g., for CB-based PUSCH) based on a first threshold quantity of one or more SRS ports and a second threshold quantity of one or more SRS ports. For example, the first threshold quantity of one or more SRS ports may be applicable when PUSCH is associated with a single SRS resource set (P). Additionally, or alternatively, the second threshold quantity of one or more SRS ports may be applicable when applicable when the PUSCH is associated with two SRS resource sets (e.g., P1 and P2) simultaneously (e.g., in SDM/FDM/SFN schemes). Further, when the second threshold quantity of one or more SRS ports is applicable, the UE 115 may indicate one quantity which is associated with each of the two SRS resource set (e.g., P1=P2), or the UE 115 may indicate separate numbers, which are associated with the corresponding SRS resource set (e.g., P1 or P2), or both. In some cases, the values of P, P1, and P2 may determine whether the UE 115 supports the first configuration, the second configuration, or both.

In some cases, the UE 115 may be RRC-configured with the first configuration or the second configuration, where the first configuration and the second configuration may be per DCI format, or per BWP, or per CC, or any combination thereof. In such cases, the first configuration and the second configuration may determine the configuration or the interpretation of threshold rank value(s) (e.g., RRC-configured), or determine the number of SRS resource sets that can be RRC-configured to the UE 115, or determine the different fields of the DCI message 225 scheduling the PUSCH (e.g., including presence and interpretation of SRS resource set indicator field, presence and interpretation of one or two SRI fields, and presence and interpretation of one or two TPMI fields), or determine the indication of SRS resource set(s) (e.g., indication of s-TRP mode versus STxMP mode), or determine the indication of the SRS resource within one or two SRS resource sets, or determine the indication of one or two ranks and one or two TPMI indices, or any combination thereof.

In some implementations, the UE 115 may operate according to the first configuration and may use two SRS resource sets, an SRS resource set indicator field, two SRI fields, and two TPMI fields to obtain information from Table 12 shown below. For example, the UE 115 may interpret the SRS resource set indicator according to Table 12 shown below. In such cases, SDM schemes may be similar to Rel-17 TDM with some differences, while FDM and SFM may be the same as Rel-17 TDM.

In some cases, the UE 115 may operate according to the second configuration and may use two SRS resource sets (e.g., for CB-based PUSCH). However, if SRS resources in the first set have threshold of P1 ports, they may not be able to be used for s-TRP scheduling (e.g., when the first SRS resource set alone is indicated) with P1+P2 PUSCH ports. In such cases, each SRS resource (e.g., in the first set or in the second set) may be configured with additional (e.g., up to P1+P2) ports. In the case that one of the SRS resource sets alone is indicated (e.g., s-TRP mode), the PUSCH ports correspond to all SRS ports of the indicated SRS resource. In another case in which both SRS resource sets are indicated (e.g., SDM, FDM, or SFN mode), the PUSCH ports associated with the first SRS resource set correspond to a subset of SRS ports of the indicated SRS resource from the first SRS resource set. Further, the PUSCH ports associated with the second SRS resource set correspond to a subset of SRS ports of the indicated SRS resource from the second SRS resource set.

The SRS port subset may be configured for all SRS ports or may be configured per SRS resource. For example, the subset may include the first half of SRS ports (e.g., all SRS ports) of the SRS resource. In another example, the subset may include the first m SRS ports of the SRS resource (e.g., per SRS resource), where the value of m is configured (e.g.,

TABLE 12

| Codepoint 245 | SRS resource set(s) | SRI | Number of PUSCH ports (p) | MaxRank | TPMI and rank |
|---|---|---|---|---|---|
| 00 | S-TRP mode with first SRS resource set (TRP1) | First SRI field: indicates one SRS resource from the first SRS resource set | Number of ports of the indicated SRS resource | X1 | First TPMI field: Indicate a rank r (r <= X1) and a TPMI index (with p. PUSCH ports and r layers) second TPMI field: Unused. |
| 01 (optional) | S-TRP mode with second SRS resource set (TRP2) | Second SRI field: indicates one SRS resource from the second SRS resource set | Number of ports of the indicated SRS resource | X2 | First TPMI field: Unused. second TPMI field: Indicate a rank r (r <= X2) and a TPMI index (with p. PUSCH ports and r layers) |
| 10 | SDM mode with (TRP1, TRP2 order) first SRI/TPMI field: first SRS resource set second SRI/TPMI field: second SRS resource set | First SRI field: indicates one SRS resource from the first SRS resource set second SRI field: indicates one SRS resource from the second SRS resource set | Number of ports of the first indicated SRS resource (p1) + number of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |
| 11 (optional) | SDM mode with (TRP2, TRP1 order) first SRI/TPMI field: first SRS resource set second SRI/TPMI field: second SRS resource set | First SRI field: indicates one SRS resource from the first SRS resource set second SRI field: indicates one SRS resource from the second SRS resource set | Number of ports of the first indicated SRS resource (p1) + number of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |

RRC-configured). Additionally, or alternatively, the subset with port numbers are explicitly configured (e.g., per SRS resource, the RRC-configurations indicate that the subset includes SRS port numbers 1 and 3 out of port numbers 0, second TPMI fields) or SDM (e.g., first TPMI field 230+ second TPMI field 230) uses a larger quantity of bits). For example, the UE 115 may interpret the SRS resource set indicator according to Table 13 shown below.

TABLE 13

| Codepoint 245 | SRS resource set(s) | SRI | Number of PUSCH ports (p) | MaxRank | TPMI and rank |
|---|---|---|---|---|---|
| SRS Resource Set Indicator Field | | | | | |
| 00 | s-TRP mode with first SRS resource set (TRP1) | First SRI field: indicates one SRS resource from the first SRS resource set | Number of ports of the indicated SRS resource | X <= X1 + X2 | Both first and second TPMI fields indicate a rank r (r <= X) and a TPMI index (with p. PUSCH ports and r layers) |
| 01 (optional) | s-TRP mode with second SRS resource set (TRP2) | Second SRI field: indicates one SRS resource from the second SRS resource set | Number of ports of the indicated SRS resource | X <= X1 + X2 | Both first and second TPMI fields indicate a rank r (r <= X) and a TPMI index (with p. PUSCH ports and r layers) |
| 10 | SDM mode with (TRP1, TRP2 order) first SRI/TPMI field: first SRS resource set second SRI/TPMI field: second SRS resource set | First SRI field: indicates one SRS resource from the first SRS resource set second SRI field: indicates one SRS resource from the second SRS resource set | Number of subset of ports of the first indicated SRS resource (p1) + number of subset of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |
| 11 (optional) | SDM mode with (TRP2, TRP1 order) First SRI/TPMI field: first SRS resource set second SRI/TPMI field: second SRS resource set | First SRI field: indicates one SRS resource from the first SRS resource set second SRI field: indicates one SRS resource from the second SRS resource set | Number of subset of ports of the first indicated SRS resource (p1) + number of subset of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |

1, 2, 3). Additional details relating to such a selection of SRS resources from a specific subset of SRS resources included in an SRS resource set are illustrated by and described with reference to FIG. 5.

In some implementations, the UE 115 may operate according to a SDM scheme and according to the second configuration. In such implementations, the UE 115 may use two SRS resource sets, an SRS resource set indicator field, two SRI fields, two TPMI fields (e.g., first option) to obtain information from Table 13 shown below. As the UE 115 uses two SRS resource sets, the UE 115 may select SRS resources from a specific subset of SRS resources, which is described in further detail with reference to FIG. 5. In some implementations, zero-padding may be applied for the two TPMI fields (e.g., depending on whether s-TRP (e.g., joint first+

In some other implementations, the UE 115 may operate according to a SDM scheme and according to the second configuration. In such implementations, the UE may use two SRS resource sets, one SRI field, one TPMI field 230 to obtain information (e.g., second option). As the UE 115 uses two SRS resource sets, the UE 115 may select SRS resources from a specific subset of SRS resources, which is described in further detail with reference to FIG. 5. In such implementations, the UE 115 may determine the size of the SRI field based on a sum of a threshold quantity of codepoints 245 used across each of the modes according to the formula below.

number of bits for the joint SRI field=$\log_2$(C1+C2+ C3+C4)

For example, the UE 115 the UE may use two SRS resource sets, one SRI field, one TPMI field 230 to obtain information according to Table 14 shown below.

alternatively, the size of the TPMI field 230 may be the configured max rank associated with the first, or the second SRS resource sets (e.g., X1/X2), or both.

TABLE 14

| Number of Codepoints 245 of joint SRI field | SRS resource set(s) | SRI | Number of PUSCH ports (p) | MaxRank | TPMI and rank |
|---|---|---|---|---|---|
| C1 (0, . . . , C1 − 1) | S-TRP mode with first SRS resource set (TRP1) | SRI field indicates one SRS resource from the first SRS resource set | Number of ports of the indicated SRS resource | X <= X1 + X2 | TPMI field indicates a rank r (r <= X) and a TPMI index (with p. PUSCH ports and r layers) |
| C2 (optional) (C1, . . . , C1 + C2 − 1) | S-TRP mode with second SRS resource set (TRP2) | SRI field indicate one SRS resource from the second SRS resource set | Number of ports of the indicated SRS resource | X <= X1 + X2 | TPMI field indicates a rank r (r <= X) and a TPMI index (with p. PUSCH ports and r layers) |
| C3 (C1 + C2, . . . , C1 + C2 + C3 − 1) | SDM mode with (TRP1, TRP2 order) first SRS resource set and Second SRS resource set | SRI field indicate one SRS resource from the first SRS resource set, and one SRS resource from the second SRS resource set | Number of subset of ports of the first indicated SRS resource (p1) + number of subset of ports of the second indicated SRS resource (p2) | X1 X2 | TPMI field indicates a first rank r1 (r1 <= X1) and a first TPMI index (with p1 PUSCH ports and r1 layers), and a second rank r2 (r2 <= X2) and a second TPMI index (with p2 PUSCH ports and r2 layers) |
| C4 (optional) (C1 + C2 + C3, C1 + C2 + C3 + C4 − 1) | SDM mode with (TRP2, TRP1 order) first SRS resource set and second SRS resource set | SRI field indicate one SRS resource from the first SRS resource set, and one SRS resource from the second SRS resource set | Number of subset of ports of the first indicated SRS resource (p1) + number of subset of ports of the second indicated SRS resource (p2) | X1 X2 | TPMI field indicates a first rank r1 (r1 <= X1) and a first TPMI index (with p1 PUSCH ports and r1 layers), and a second rank r2 (r2 <= X2) and a second TPMI index (with p2 PUSCH ports and r2 layers) |

Further, in such implementations, the size of the TPMI field 230 may be equal to a threshold whether one rank and TPMI index (e.g., in case of SRI of the first C1+C2 SRI codepoints 245) are used or whether two ranks and TPMI indices (e.g., in case of remaining C3+C4 SRI codepoints 245) are used. In the case of one rank and TPMI index, the size of the TPMI field 230 may be the indicated threshold quantity of PUSCH ports (e.g., P) (e.g., the threshold quantity of ports of the SRS resources in the first/second SRS resource sets). Additionally, or alternatively, the size of the TPMI field 230 may be the configured maxRank (X). In the case of two ranks and TPMI indices, the size of the TPMI field 230 may be the threshold quantity of PUSCH ports (e.g., P1) for the first indicated TPMI index (e.g., the threshold quantity of subset of ports of the SRS resources in the first SRS resource sets), and threshold quantity of PUSCH ports (e.g., P2) for the second indicated TPMI index (e.g., the threshold quantity of subset of ports of the SRS resources in the second SRS resource sets). Additionally, or In cases where the UE 115 uses two SRS resource sets, one SRI field, one TPMI field 230 (e.g., second option) to obtain information, the signaling diagram 200 may experience specific performance effects (e.g., lower DCI overhead, equal TPMI index and rank indication, more complex SRI tables, SRI tables inconsistent with Rel-17). For instance, the signaling diagram 200 may have lower DCI message 225 overhead related to the indication of SRS resource set(s) and SRS resource(s). As an example, if 3 SRS resources are in the first set and another 3 SRS resources in a first option may determine a first TPMI field 230 size (e.g., 2 bits (SRS resource set indicator)+2 bits (first SRI field)+2 bits (second SRI field)=6 bits) while a second option may determine a second TPMI field 230 size (e.g., ceiling(log 2(3+3+3*3+3*3))=5 bits) that is smaller than the first.

In some other implementations, a UE 115 may operate according to a SDM scheme and according to the second configuration. In such implementations, the UE 115 may use two SRS resource sets and one joint SRI/TPMI field to obtain information. As the UE 115 uses two SRS resource sets, the UE 115 may select SRS resources from a specific subset of SRS resources, which is described in further detail with reference to FIG. 5. In such implementations, the UE 115 may determine the size of the joint SRI/TPMI field based on a sum of a threshold quantity (e.g., a threshold number) of codepoints 245 used across each of the modes according to the formula below.

$$\text{number of bits for the joint SRI/TPMI field} = \log_2(C1+C2+C3+C4)$$

For example, the UE 115 the UE may use two SRS resource sets, one SRI field, one TPMI field 230 to obtain information according to Table 15 shown below.

associated with SDM mode (e.g., they may not be allowed to be individually indicated for a PUSCH).

The first and third SRS resource sets may be restricted to be configured with the same power control parameters. The second (if any) and the fourth SRS resource sets may be similarly restricted. The third SRS resource set may include the same quantity of SRS resources as the quantity of SRS resources of the first SRS resource set. Similarly, the second (if any) may include the same number of SRS resources compared to the quantity of SRS resources as the fourth SRS resource set. Further, the i'th SRS resource in the first SRS resource set and the i'th SRS resource in the third SRS resource set may be restricted to be associated with the same beam, or TCI state, or spatial relation information, or any

TABLE 15

| Number of Codepoints 245 of joint SRI/TPMI field | SRS resource set(s) | MaxRank | SRI, TPMI, and rank |
|---|---|---|---|
| C1 $(0, \ldots, C1 - 1)$ | S-TRP mode with first SRS resource set (TRP1) | $X <= X1 + X2$ | The joint field indicates one SRS resource from the first SRS resource set (with p. SRS ports), a rank r (r <= X) and a TPMI index (with p. PUSCH ports and r layers) |
| C2 (optional) $(C1, \ldots, C1 + C2 - 1)$ | s-TRP mode with second SRS resource set (TRP2) | $X <= X1 + X2$ | The joint field indicates one SRS resource from the second SRS resource set (with p. SRS ports), a rank r (r <= X) and a TPMI index (with p. PUSCH ports and r layers) |
| C3 $(C1 + C2, \ldots, C1 + C2 + C3 - 1)$ | SDM mode with (TRP1, TRP2 order) first SRS resource set and second SRS resource set | X1 X2 | The joint field indicates one SRS resource from the first SRS resource set (with p1 being the number of subset of the SRS ports), a first rank r1 (r1 <= X1) and a first TPMI index (with p1 PUSCH ports and r1 layers); and one SRS resource from the second SRS resource set (with p2 being the number of subset of the SRS ports), a second rank r2 (r2 <= X2) and a second TPMI index (with p2 PUSCH ports and r2 layers) |
| C4 (optional) $(C1 + C2 + C3, \ldots, C1 + C2 + C3 + C4 - 1)$ | SDM mode with (TRP2, TRP1 order) first SRS resource set and second SRS resource set | X1 X2 | The joint field indicates one SRS resource from the first SRS resource set (with p1 being the number of subset of the SRS ports), a first rank r1 (r1 <= X1) and a first TPMI index (with p1 PUSCH ports and r1 layers); and one SRS resource from the second SRS resource set (with p2 being the number of subset of the SRS ports), a second rank r2 (r2 <= X2) and a second TPMI index (with p2 PUSCH ports and r2 layers) |

In the case where the UE 115 use two SRS resource sets and one joint SRI/TPMI field to obtain information, the signaling diagram 200 may experience specific performance effects (e.g., lower DCI overhead, zero padding not used, more complex SRI tables, SRI tables inconsistent with Rel-17). For instance, the signaling diagram 200 may have lower DCI message 225 overhead related to indication of rank(s) and TPMI index(es). Further the associated tables may be large and complicated to define (e.g., may have more than 1024 rows (10 bits)).

In some other implementations, a UE 115 may operate according to a SDM scheme and according to the second configuration and may use four (or three) SRS resource sets. As the UE 115 does not reuse the SRS resource sets between s-TRP and SDM scheduling, determination of subset of SRS ports of an indicated SRS resource may not be used. In such implementations, the UE 115 may configure the SRS resource sets. For example, a first and a second (optional) SRS resource set may be associated with s-TRP mode (e.g., they may not be indicated together for the same PUSCH). Further, a third and a fourth SRS resource set may be combinations thereof. Additionally, or alternatively, the quantity of SRS ports of the i'th SRS resource in the third SRS resource set may be restricted to be smaller than (or equal to) the quantity of SRS ports of the i'th SRS resource in the first SRS resource set. The i'th SRS resource in the second SRS resource set (if any) and the i'th SRS resource in the fourth SRS resource set may have similar restrictions. The UE 115 may identify which SRS resource sets are the first, the second (optional), the third, and the fourth based on explicit RRC configuration or implicitly based on SRS resource set ID, or both.

In some other implementations, the UE 115 may operate according to a SDM scheme and according to the second configuration. In such implementations, the UE 115 may use four (or three) SRS resource sets, an SRS resource set indicator field, two SRI fields, and two TPMI fields 230 to obtain information. In such implementations, for example, the SRS resource set indicator field may be interpreted as shown in Table 16 below. Further, in some cases, the subset of SRS ports may not be used as the SRS resource is not shared between s-TRP and m-TRP scheduling.

TABLE 16

| Codepoint 245 | SRS resource set(s) | SRI | Number of PUSCH ports (p) | MaxRank | TPMI and rank |
|---|---|---|---|---|---|
| 00 | s-TRP mode with first SRS resource set (TRP1) | First SRI field: indicates one SRS resource from the first SRS resource set | Number of ports of the indicated SRS resource | X <= X1 + X2 | Both first and second TPMI fields indicate a rank r (r <= X) and a TPMI index (with p. PUSCH ports and r layers) |
| 01 (optional) | s-TRP mode with second SRS resource set (TRP2) | second SRI field: indicates one SRS resource from the second SRS resource set | Number of ports of the indicated SRS resource | X <= X1 + X2 | Both first and second TPMI fields indicate a rank r (r <= X) and a TPMI index (with p. PUSCH ports and r layers) |
| 10 | SDM mode with (TRP1, TRP2 order) first SRI field: third SRS resource set second SRI field: fourth SRS resource set | First SRI field: indicates one SRS resource from the third SRS resource set second SRI field: indicates one SRS resource from the fourth SRS resource set | Number of ports of the first indicated SRS resource (p1) + number of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |
| 11 (optional) | SDM mode with (TRP2, TRP1 order) first SRI field: third SRS resource set second SRI field: fourth SRS resource set | First SRI field: indicates one SRS resource from the third SRS resource set second SRI field: indicates one SRS resource from the fourth SRS resource set | Number of ports of the first indicated SRS resource (p1) + number of ports of the second indicated SRS resource (p2) | X1 X2 | First TPMI field: Indicate a rank r1 (r1 <= X1) and a TPMI index (with p1 PUSCH ports and r1 layers) second TPMI field: Indicate a rank r2 (r2 <= X2) and a TPMI index (with p2 PUSCH ports and r2 layers) |

45

In some other implementations, the UE 115 may operate according to a SDM scheme and according to the second configuration. In such implementations, the UE 115 may use four (or three) SRS resource sets, one SRI field, and one TPMI field 230 to obtain information. In such implementations, the UE 115 may determine the size of the SRI field based on a sum of a threshold quantity of codepoints 245 used across each of the modes. For example, the UE 115 may use one SRI field and one TPMI field 230 to obtain information according to Table 17 shown below. Further, the subset of SRS ports may not be used as the SRS resource is not shared between s-TRP and m-TRP scheduling.

TABLE 17

| Number of Codepoints 245 of joint SRI field | SRS resource set(s) | SRI | Number of PUSCH ports (p) | MaxRank | TPMI and rank |
|---|---|---|---|---|---|
| C1 (0, . . . , C1 − 1) | s-TRP mode with first SRS resource set (TRP1) | SRI field indicates one SRS resource from the first SRS resource set | Number of ports of the indicated SRS resource | X <= X1 + X2 | TPMI field indicates a rank r (r <= X) and a TPMI index (with p. PUSCH ports and r layers) |
| C2 (optional) (C1, . . . , C1 + C2 − 1) | S-TRP mode with second SRS resource set (TRP2) | SRI field indicate one SRS resource from the second SRS resource set | Number of ports of the indicated SRS resource | X <= X1 + X2 | TPMI field indicates a rank r (r <= X) and a TPMI index (with p. PUSCH ports and r layers) |

TABLE 17-continued

| Number of Codepoints 245 of joint SRI field | SRS resource set(s) | SRI | Number of PUSCH ports (p) | MaxRank | TPMI and rank |
|---|---|---|---|---|---|
| C3 (C1 + C2, . . . , C1 + C2 + C3 − 1) | SDM mode with (TRP1, TRP2 order) third SRS resource set and fourth SRS resource set | SRI field indicate one SRS resource from the third SRS resource set, and one SRS resource from the fourth SRS resource set | Number of sports of the first indicated SRS resource (p1) + number of ports of the second indicated SRS resource (p2) | X1 X2 | TPMI field indicates a first rank r1 (r1 <= X1) and a first TPMI index (with p1 PUSCH ports and r1 layers), and a second rank r2 (r2 <= X2) and a second TPMI index (with p2 PUSCH ports and r2 layers) |
| C4 (optional) (C1 + C2 + C3, . . . , C1 + C2 + C3 + C4 − 1) | SDM mode with (TRP2, TRP1 order) third SRS resource set and fourth SRS resource set | SRI field indicate one SRS resource from the third SRS resource set, and one SRS resource from the fourth SRS resource set | Number of ports of the first indicated SRS resource (p1) + number of ports of the second indicated SRS resource (p2) | X1 X2 | TPMI field indicates a first rank r1 (r1 <= X1) and a first TPMI index (with p1 PUSCH ports and r1 layers), and a second rank r2 (r2 <= X2) and a second TPMI index (with p2 PUSCH ports and r2 layers) |

In some other implementations, the UE 115 may operate according to a SDM scheme and according to the second configuration. In such implementations, the UE 115 may use four (or three) SRS resource sets and one joint SRI/TPMI field to obtain information. In such implementations, the UE 115 may determine the size of the joint SRI/TPMI field based on a sum of threshold number of codepoints 245 used across each of the modes. For example, the UE 115 may use the one joint SRI/TPMI field to obtain information according to Table 18 shown below. Further, the subset of SRS ports may not be used as the SRS resource is not shared between s-TRP and m-TRP scheduling.

TABLE 18

| Number of Codepoints 245 of joint SRI/TPMI field | SRS resource set(s) | MaxRank | SRI, TPMI, and rank |
|---|---|---|---|
| C1 (0, . . . , C1 − 1) | S-TRP mode with first SRS resource set (TRP1) | X <= X1 + X2 | The joint field indicates one SRS resource from the first SRS resource set (with p. SRS ports), a rank r (r <= X) and a TPMI index (with p. PUSCH ports and r layers) |
| C2 (optional) (C1, . . . , C1 + C2 − 1) | s-TRP mode with second SRS resource set (TRP2) | X <= X1 + X2 | The joint field indicates one SRS resource from the second SRS resource set (with p. SRS ports), a rank r (r <= X) and a TPMI index (with p. PUSCH ports and r layers) |
| C3 (C1 + C2, . . . , C1 + C2 + C3 − 1) | SDM mode with (TRP1, TRP2 order) third SRS resource set and fourth SRS resource set | X1 X2 | The joint field indicates one SRS resource from the third SRS resource set (with p1 being the number of the SRS ports), a first rank r1 (r1 <= X1) and a first TPMI index (with p1 PUSCH ports and r1 layers); and one SRS resource from the fourth SRS resource set (with p2 being the number of the SRS ports), a second rank r2 (r2 <= X2) and a second TPMI index (with p2 PUSCH ports and r2 layers) |
| C4 (optional) (C1 + C2 + C3, . . . , C1 + C2 + C3 + C4 − 1) | SDM mode with (TRP2, TRP1 order) third SRS resource set and fourth SRS resource set | X1 X2 | The joint field indicates one SRS resource from the third SRS resource set (with p1 being the number of the SRS ports), a first rank r1 (r1 <= X1) and a first TPMI index (with p1 PUSCH ports and r1 layers); and one SRS resource from the fourth SRS resource set (with p2 being the number of the SRS ports), a second rank r2 (r2 <= X2) and a second TPMI index (with p2 PUSCH ports and r2 layers) |

In some other implementations, a UE 115 may operate according to a FDM or SFN scheme and according to the second configuration. In such cases, the implementations may be the same as the implementations where the UE 115 uses an SDM scheme with some differences. For example, in the case of FDM/SFN schemes the maxRank associated with the first and second resource sets may be the same (e.g., X1=X2), the indicated number of layers (e.g., r1 and r2) may be the same, and the indicated number of PUSCH ports (e.g., P1 and P2) may be the same.

Further, in cases where the UE 115 uses an SRS resource set indicator field, two SRI fields, and two TPMI fields 230, the first TPMI field may indicate the rank r, and the second TPMI field may indicate a second TPMI index with the same rank r (e.g., similar to a Rel-17 TDM case). In cases where the UE 115 uses one SRI field and one TPMI field, the TPMI field indicates one rank r and two TPMI indices. In cases where the UE 115 uses one joint SRI/TPMI field, the joint SRI/TPMI field indicates one rank r and two TPMI indices. In cases where the UE 115 uses two SRS resource sets, the two indicated SRS resources (e.g., from the first and second SRS resource sets, respectively) may have the same number of subset of ports. In cases, where the UE 115 uses four (or three) SRS resource sets, the two indicated SRS resources (e.g., from the third and fourth SRS resource sets, respectively) may have the same number of ports. Further, in the options with 4 SRS resource set, the 2nd SRS resource set may be optional (may or may not be used depending on whether the second mode above is specified or not). In the absence of the 2nd SRS resource set, in these options, there may be 3 SRS resource sets instead (one for sTRP mode, and two for SDM/FDM/SFN modes).

Figure 3:
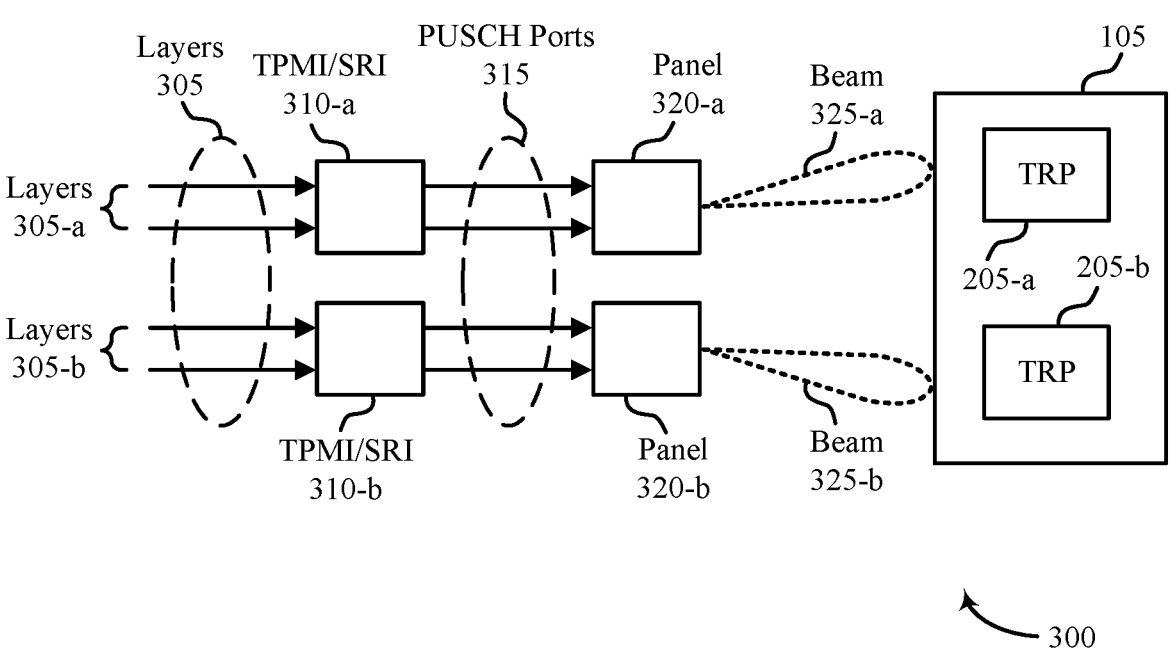
FIGS. 3 and 4 show example multi-panel transmission schemes that support techniques for interpreting DCI fields in codebook-based multi-panel deployments with dynamic panel switching in accordance with one or more aspects of the present disclosure.
Figure 3:
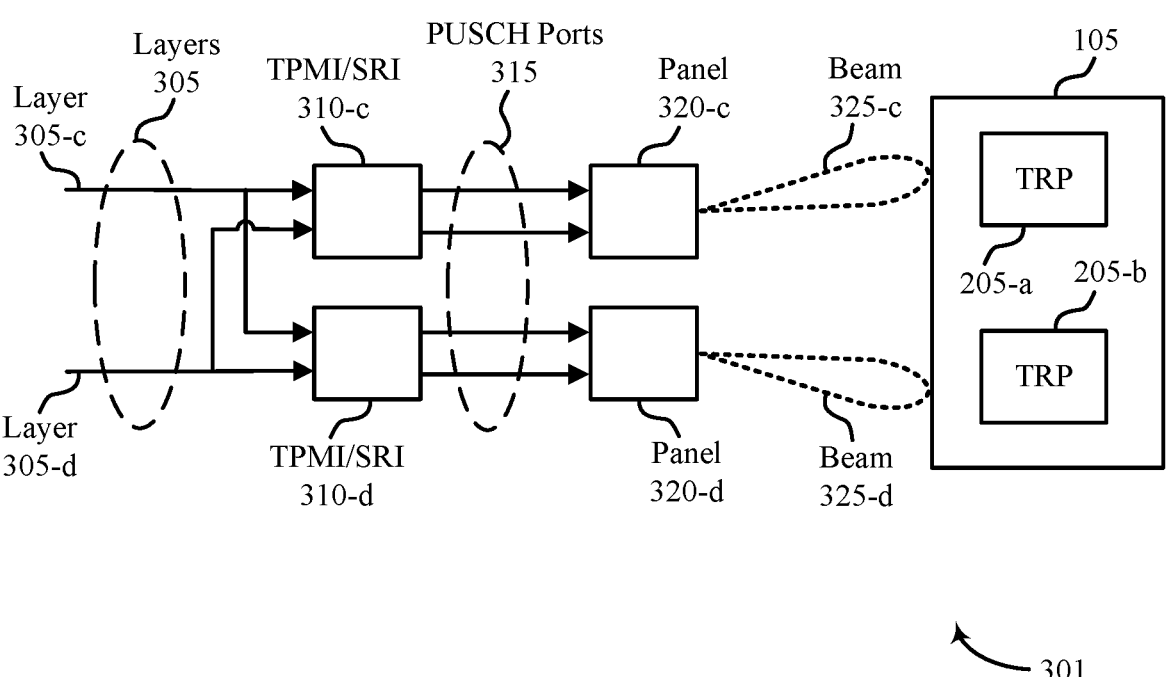

FIG. 3 shows example multi-panel transmission schemes 300 and 301 that supports techniques for interpreting DCI fields in codebook-based multi-panel deployments with dynamic panel switching in accordance with one or more aspects of the present disclosure. The multi-panel transmission schemes 300 and 301 may implement or be implemented to realize or facilitate aspects of the wireless communications system 100 or the signaling diagram 200. For example, the multi-panel transmission schemes 300 and 301 illustrate communication between a UE 115 and a network entity 105 associated with a TRP 205-a and a TRP 205-b, which may be examples of corresponding devices as illustrated by and described with reference to FIGS. 1 and 2.

In some examples, the multi-panel transmission schemes 300 and 301 may support a PUSCH transmission from a single UE to multiple TRPs 205 of a network entity 105 via different directional beams 325, where different beams 325 may be associated with different SRS resource sets, different transmission configuration indicator (TCI) states, different layers 305, different PUSCH ports 315, or different panels 320 of the UE 115, or any combination thereof. The multi-panel transmission scheme 300 may illustrate an example of a single-DCI based space division duplexing (SDM) PUSCH. The multi-panel transmission scheme 301 may illustrate an example of a single-DCI based single frequency network (SFN) PUSCH. Additionally, layers 305 may be separately mapped to PUSCH ports 315 (e.g., according to whether a corresponding PUSCH transmission is CB-based or non-CB-based) by different precoders.

In accordance with the multi-panel transmission scheme 300, a single DCI may schedule a PUSCH with two sets of DMRS ports or layers 305 to be transmitted from two panels 320 with different transmit beams 325, different precoders, or different power control parameters, or any combination thereof. For example, two sets of layers 305, including a first set of layers 305-a and a second set of layers 305-b may be associated with two SRS resource sets (such as a first SRS resource set and a second SRS resource set), respectively. In some aspects, the DCI may include an SRS resource set indicator field, two SRI fields, two numbers of layers, or two TPMI indices, or any combination thereof, and may support rank combinations of 1+1, 1+2, 2+1, or 2+2 layers. In some aspects, a scheduling DCI includes an SRS resource set indicator field, two SRI fields, two numbers of layers, and two TPMI indices for CB-based PUSCH transmissions and includes an SRS resource set indicator field and two SRI fields for non-CB-based PUSCH transmissions. Additionally, or alternatively, the DCI may not include an SRS resource set indicator field, may include any quantity of SRI fields (such as zero, one, or two SRI fields), or may include any quantity of TPMI fields (such as zero, one, or two TPMI fields), or any combination thereof, in accordance with the implementations disclosed herein.

As illustrated by the multi-panel transmission scheme 300, a first set of layers 305-a may be indicated by a first TPMI/SRI field 310-a and may be associated with a panel 320-a and a beam 325-a of the UE 115. The beam 325-a may be associated with a first SRS resource set or a first TCI state, or both. Further, a second set of layers 305-b may be indicated by a second TPMI/SRI field 310-b and may be associated with a panel 320-b and a beam 325-b of the UE 115. The beam 325-b may be associated with a second SRS resource set or a second TCI state, or both. The first set of layers 305-a and the second set of layers 305-a together may be referred to as a set of layers 305 and may be associated with a set of PUSCH ports 315.

In accordance with the multi-panel transmission scheme 301, a single DCI may schedule a PUSCH, where each DMRS port or layer 305 of the PUSCH may be transmitted from two panels 320 with different transmit beams 325, different precoders, or different power control parameters, or any combination thereof. In some aspects, each DMRS port or layer 305 of the PUSCH may be associated with two SRS resource sets. Further, a DCI may include an SRS resource set indicator field, two SRI fields, or two TPMI indices (with a same number of layers), or any combination thereof. In some aspects, a scheduling DCI may include an SRS resource set indicator field, two SRI fields, and two TPMI indices for CB-based PUSCH transmissions and may include an SRS resource set indicator field and two SRI fields for non-CB-based PUSCH transmissions. Additionally, or alternatively, the DCI may not include an SRS resource set indicator field, may include any quantity of SRI fields (such as zero, one, or two SRI fields), or may include any quantity of TPMI fields (such as zero, one, or two TPMI fields), or any combination thereof, in accordance with the implementations disclosed herein.

As illustrated by the multi-panel transmission scheme 301, a layer 305-c may be indicated by a TPMI/SRI field 310-c and may be associated with a panel 320-c and a beam 325-c of the UE 115. The beam 325-c may be associated with a first SRS resource set or a first TCI state, or both. Further, a layer 305-d may be indicated by a TPMI/SRI field 310-d and may be associated with a panel 320-d and a beam 325-d of the UE 115. The beam 325-d may be associated with a second SRS resource set or a second TCI state, or both. The layer 305-c and the layer 305-d together may be referred to as a set of layers 305 and may be associated with a set of PUSCH ports 315.

Figure 4:

FIG. 4 shows an example multi-panel transmission scheme 400 that supports techniques for interpreting DCI fields in codebook-based multi-panel deployments with dynamic panel switching in accordance with one or more aspects of the present disclosure. The multi-panel transmission scheme 400 may implement or be implemented to realize or facilitate aspects of the wireless communications system 100 or the signaling diagram 200. For example, the multi-panel transmission scheme 400 illustrates communication between a UE 115 and a network entity 105 associated with a TRP 205-*a* and a TRP 205-*b*, which may be examples of corresponding devices as illustrated by and described with reference to FIGS. 1 and 2.

In some examples, the multi-panel simultaneous transmission scheme 400 may support a PUSCH transmission from a single UE to multiple TRPs 205 of a network entity 105 via different directional beams 405, where different beams 405 may be associated with different time-frequency resource allocations 415. The multi-panel transmission scheme 400 may illustrate an example of a single-DCI based FDM PUSCH. The PUSCH may be scheduled with multiple sets of RBs transmitted from multiple panels. The panels of the UE 115 may be associated with different beams 405, different precoders, different power control parameters, or any combination thereof. Further, the multiple sets of RBs may be associated with multiple SRS resource sets.

In accordance with the multi-panel transmission scheme 400, a single DCI may schedule a PUSCH with two sets of RBs to be transmitted from two different panels with different transmit beams 405, different precoders, or different power control parameters, or any combination thereof. For example, two sets of RBs may be associated with two SRS resource sets (such as a first SRS resource set and a second SRS resource set), respectively. The two sets of RBs may be included in an FDM scheme 410, such as an FDM scheme 410-*a* and an FDM scheme 410-*b*. In some examples, the FDM scheme 410 may include a single RV (e.g., for joint rate matching) or two RVs (e.g., for repetition or separate rate matching). In some examples, such as in examples in which the DCI schedules a non-CB-based PUSCH transmission, the DCI may include an SRS resource set indicator field and two SRI fields. In some other examples, such as in examples in which the DCI schedules a CB-based PUSCH transmission, the DCI may include an SRS resource set indicator field, two SRI fields, and two TPMI indices (with a same number of layers). Additionally, or alternatively, the DCI may not include an SRS resource set indicator field, may include any quantity of SRI fields (such as zero, one, or two SRI fields), or may include any quantity of TPMI fields (such as zero, one, or two TPMI fields), or any combination thereof, in accordance with the implementations disclosed herein.

As illustrated by the multi-panel transmission scheme 400, a UE 115 may utilize the FDM scheme 410-*a* or the FDM scheme 410-*b*. In accordance with the FDM scheme 410-*a*, a PUSCH transmission via the time-frequency resource allocation 415-*a* and a PUSCH transmission via the time-frequency resource allocation 415-*b* may be associated with a same redundancy version (RV), such as an RV1. In accordance with the FDM scheme 410-*b*, a PUSCH transmission via the time-frequency resource allocation 415-*a* and a PUSCH transmission via the time-frequency resource allocation 415-*b* may be associated with different RVs, such as an RV1 and an RV2.

Further, the time-frequency resource allocation 415-*a* and the time-frequency resource allocation 415-*b* may be associated with different TCI states, different SRS resource sets (e.g., a first SRS resource set and a second SRS resource set), or a combination thereof. In some aspects, a beam 405-*a* may be associated with the time-frequency resource allocation 415-*a* and a beam 405-*b* may be associated with the time-frequency resource allocation 415-*b*. As such, the beam 405-*a* may be associated with a first SRS resource set and a first TCI state and the beam 405-*b* may be associated with a second SRS resource set and a second TCI state.

Figure 5:
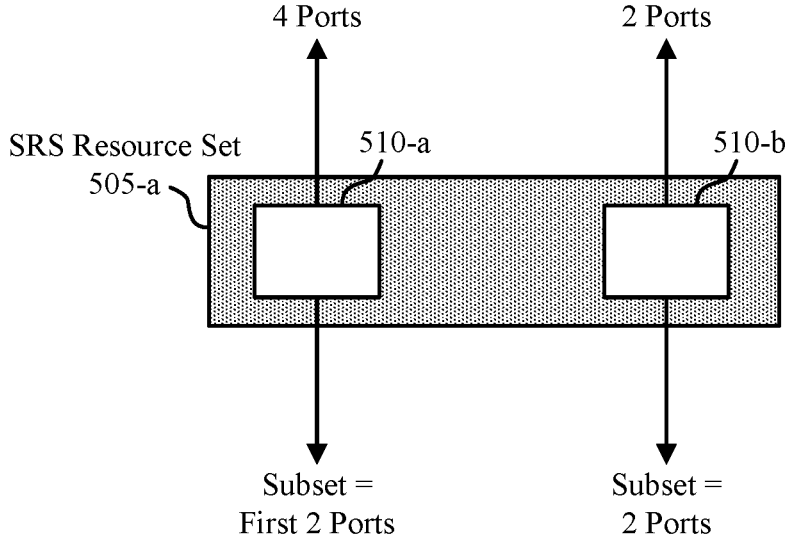
FIG. 5 shows an example sounding reference signal (SRS) resource port selection procedure that supports techniques for interpreting DCI fields in codebook-based multi-panel deployments with dynamic panel switching in accordance with one or more aspects of the present disclosure.
Figure 5:
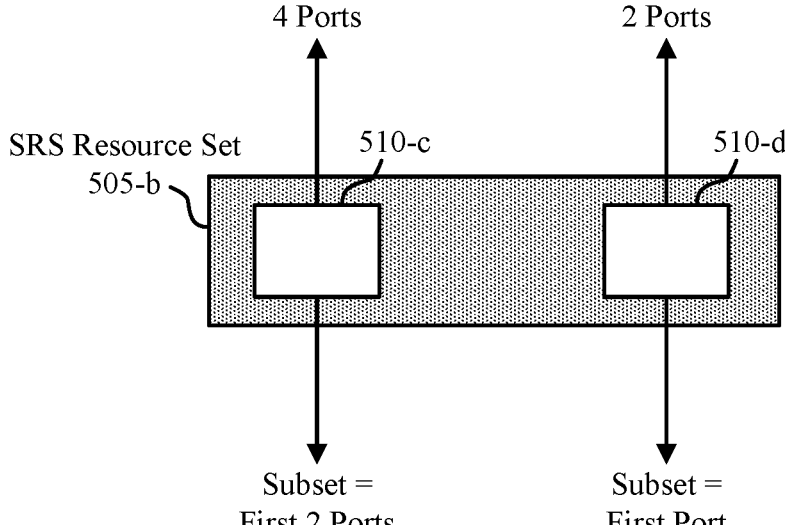

FIG. 5 shows an example SRS resource port selection procedure 500 that supports techniques for interpreting DCI fields in codebook-based multi-panel deployments with dynamic panel switching in accordance with one or more aspects of the present disclosure. The SRS resource port selection procedure 500 may implement or be implemented to realize or facilitate aspects of the wireless communications system 100, the signaling diagram 200, the multi-panel transmission schemes 300 or 301, or the multi-panel transmission scheme 400.

In some implementations, the UE 115 may employ the SRS resource port selection procedure 500 to select a subset of ports of one or more SRS resources 510 from one or more SRS resource sets 505. For example, an SRS resource set 505-*a* may include an SRS resource 510-*a* associated with 4 ports and an SRS resource 510-*b* associated with 2 ports. In accordance with the SRS resource port selection procedure 500, the UE 115 may select the first 2 ports from the SRS resource 510-*a* and may select the two ports from the SRS resource 510-*b*. Further, the SRS resource set 505-*b* may include an SRS resource 510-*c* associated with 4 ports and an SRS resource 510-*d* associated with 2 ports. In accordance with the SRS resource port selection procedure 500, the UE 115 may select the first 2 ports from the SRS resource 510-*c* and may select the first port from the SRS resource 510-*d*.

In some aspects, the subset from which the UE 115 selects ports may be configured, such as RRC configured (such as per SRS resource 510). Additional details relating to the SRS resource port selection procedure 500 are illustrated by Table 19 below.

TABLE 19

| Mode | Indicated SRS resource(s) | PUSCH ports |
|---|---|---|
| Only first SRS resource set (STRP) | SRS resource 0 | Corresponds to the 4 ports of SRS resource 0 |
| Both SRS resource sets (SDM) | SRS resource 0 (from the first set) and SRS resource 2 (from the second set) | PUSCH ports associated with the first SRS resource set: Correspond to first 2 ports of SRS resource 0 PUSCH ports associated with the second SRS resource set: Correspond to first 2 ports of SRS resource 2 |

Figure 6:
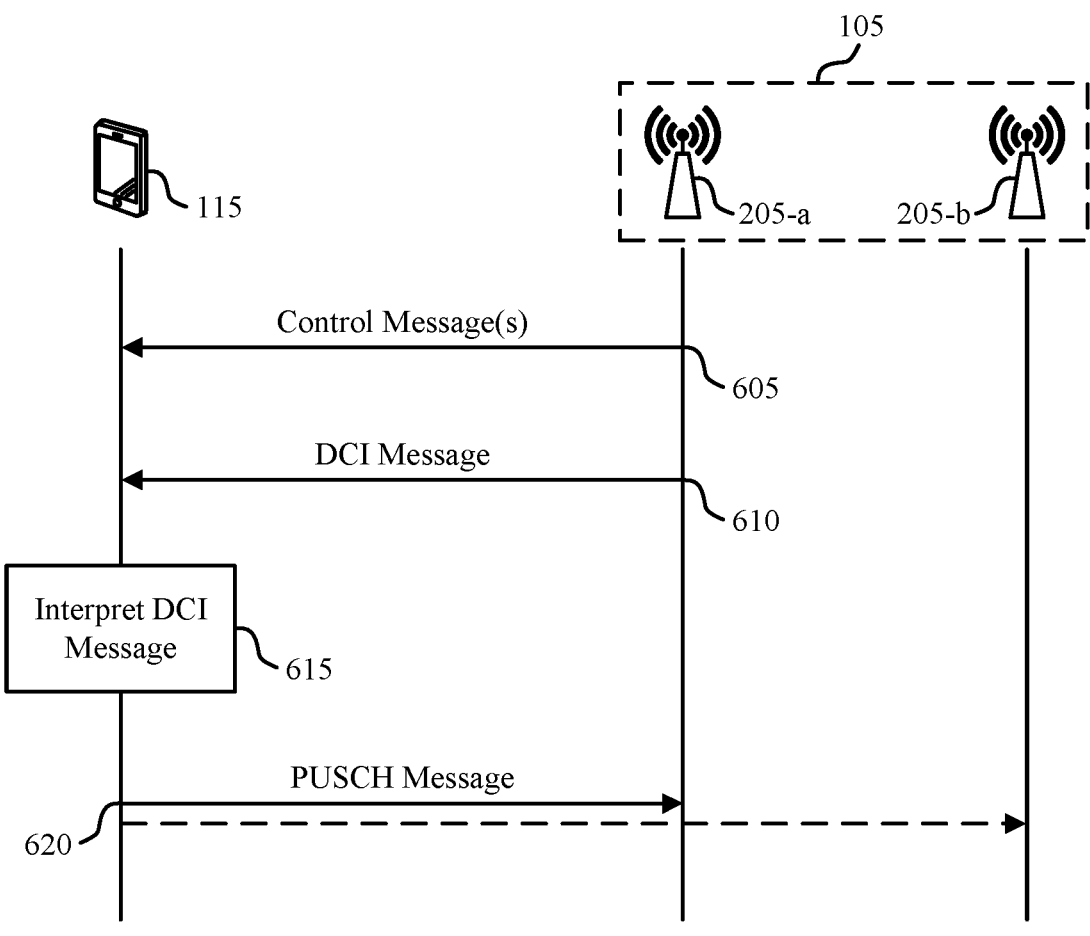
FIG. 6 shows an example process flow that supports techniques for interpreting DCI fields in codebook-based multi-panel deployments with dynamic panel switching in accordance with one or more aspects of the present disclosure.

FIG. 6 shows an example process flow 600 that supports techniques for interpreting DCI) fields in codebook-based multi-panel deployments with dynamic panel switching in accordance with one or more aspects of the present disclosure. The process flow 600 may implement or be implemented to realize or facilitate aspects of the wireless communications system 100, the signaling diagram 200, the multi-panel transmission schemes 300 or 301, the multi-panel transmission scheme 400, or the SRS resource port selection procedure 500. For example, the process flow 600 illustrates communication between a UE 115 and a network entity 105 associated with a TRP 205 a and a TRP 205 b, which may be examples of corresponding devices as illustrated by and described with reference to FIGS. 1 and 2.

In the following description of the process flow 600, the operations may be performed (such as reported or provided) in a different order than the order shown, or the operations performed by the example devices may be performed in different orders or at different times. For example, specific operations also may be left out of the process flow 600, or other operations may be added to the process flow 600. Further, although some operations or signaling may be shown to occur at different times for discussion purposes, these operations may actually occur at the same time. Further, the signaling illustrated by and described with reference to FIG. 6 may include one or more UCI messages, one or more DCI messages, RRC signaling, one or more MAC-CEs, or one or more data messages, or any combination thereof.

At 605, a TRP 205-*a* may transmit one or more control messages to a UE 115. The one or more control messages may indicate a quantity of a plurality of SRS resource sets configured at the UE 115, a quantity of one or more SRS resource indicator fields included in downlink control information, and a quantity of one or more TPMI fields included in the downlink control information. Additionally, the plurality of SRS resource sets may be configured for codebook usage. The one or more control messages may additionally indicate a plurality of maximum rank values and a set of one or more maximum number of ports values. The plurality of maximum rank values may be associated with uplink shared channel transmissions from the UE 115. Further, a quantity of the plurality of maximum rank values and configured values of the set of one or more maximum number of ports values may indicate mapping a content of the one or more TPMI fields and a quantity of ports. The quantity of the plurality of maximum rank values may be associated with at least one SRS resource from the plurality of SRS resource sets.

Further, at 605, the UE 115 may receive one or more control messages from the TRP 205-*a*. The one or more control messages may indicate the quantity of the plurality of SRS resource sets configured at the UE 115, the quantity of one or more SRS resource indicator fields included in downlink control information, and the quantity of one or more TPMI fields included in the downlink control information. Additionally, the plurality of SRS resource sets may be configured for codebook usage. The one or more control messages may additionally indicate the plurality of maximum rank values and the set of one or more maximum number of ports values. The plurality of maximum rank values may be associated with uplink shared channel transmissions from the UE 115. Further, the quantity of the plurality of maximum rank values and configured values of the set of one or more maximum number of ports values may indicate mapping a content of the one or more TPMI fields and the quantity of ports. The quantity of the plurality of maximum rank values may be associated with at least one SRS resource from the plurality of SRS resource sets.

At 610, the TRP 205-*a* may transmit a DCI message that schedules an uplink shared channel message. The DCI message may include the one or more SRS resource indicator fields and the one or more TPMI fields.

Moreover, at 610, the UE 115 may receive from the TRP 205-*a*, the DCI message that schedules the uplink shared channel message. The DCI message may include the one or more SRS resource indicator fields and the one or more TPMI fields.

At 615, in some aspects of the present disclosure, the receiving of the downlink control information message (e.g., transmitted from the TRP 205-*a*) at the UE 115 may include interpreting the one or more TPMI fields. The TPMI fields may be in accordance with the mapping indicated by the quantity of the plurality of maximum rank values and the configured values of the set of one or more maximum number of ports values. In some examples, the one or more TPMI fields may indicate up to a quantity of ports for each SRS resource indicated by the one or more SRS resource indicator fields.

At 620, the UE 115 may transmit the uplink shared channel message to the TRP 205-*a* or, in some examples, to a TRP 205-*b*. The uplink shared channel message may be in accordance with the mapping between the content of the one or more TPMI fields and the quantity of ports associated with the at least one SRS resource from the plurality of SRS resource sets.

Further, at 620, the TRP 205-*a* or, in some cases, the TRP 205-*b*, may receive the uplink shared channel message from the UE 115. The uplink shared channel message may be in accordance with the mapping between the content of the one or more TPMI fields and the quantity of ports associated with the at least one SRS resource from the plurality of SRS resource sets.

Figure 7:
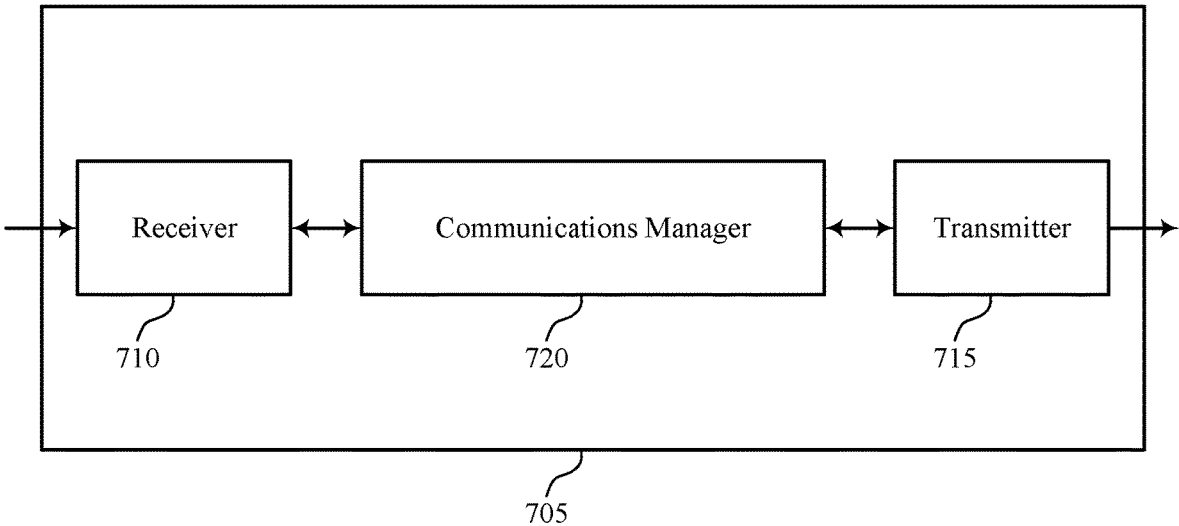
FIGS. 7 and 8 show block diagrams of devices that support techniques for interpreting DCI fields in codebook-based multi-panel deployments with dynamic panel switching in accordance with one or more aspects of the present disclosure.

FIG. 7 shows a block diagram 700 of a device 705 that supports techniques for interpreting DCI fields in codebook-based multi-panel deployments with dynamic panel switching in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for interpreting DCI fields in codebook-based multi-panel deployments with dynamic panel switching). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for interpreting DCI fields in codebook-based multi-panel deployments with dynamic panel switching). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for interpreting DCI fields in codebook-based multi-panel deployments with dynamic panel switching as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving one or more control messages that indicate: a quantity of a set of multiple SRS resource sets configured at the UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The communications manager 720 may be configured as or otherwise support a means for receiving a downlink control information message that schedules an uplink shared channel message, the downlink control information message including the one or more SRS resource indicator fields and the one or more TPMI fields. The communications manager 720 may be configured as or otherwise support a means for transmitting the uplink shared channel message in accordance with the mapping between the content of the one or more TPMI fields and the quantity of ports associated with the at least one SRS resource from the set of multiple SRS resource sets.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources.

Figure 8:
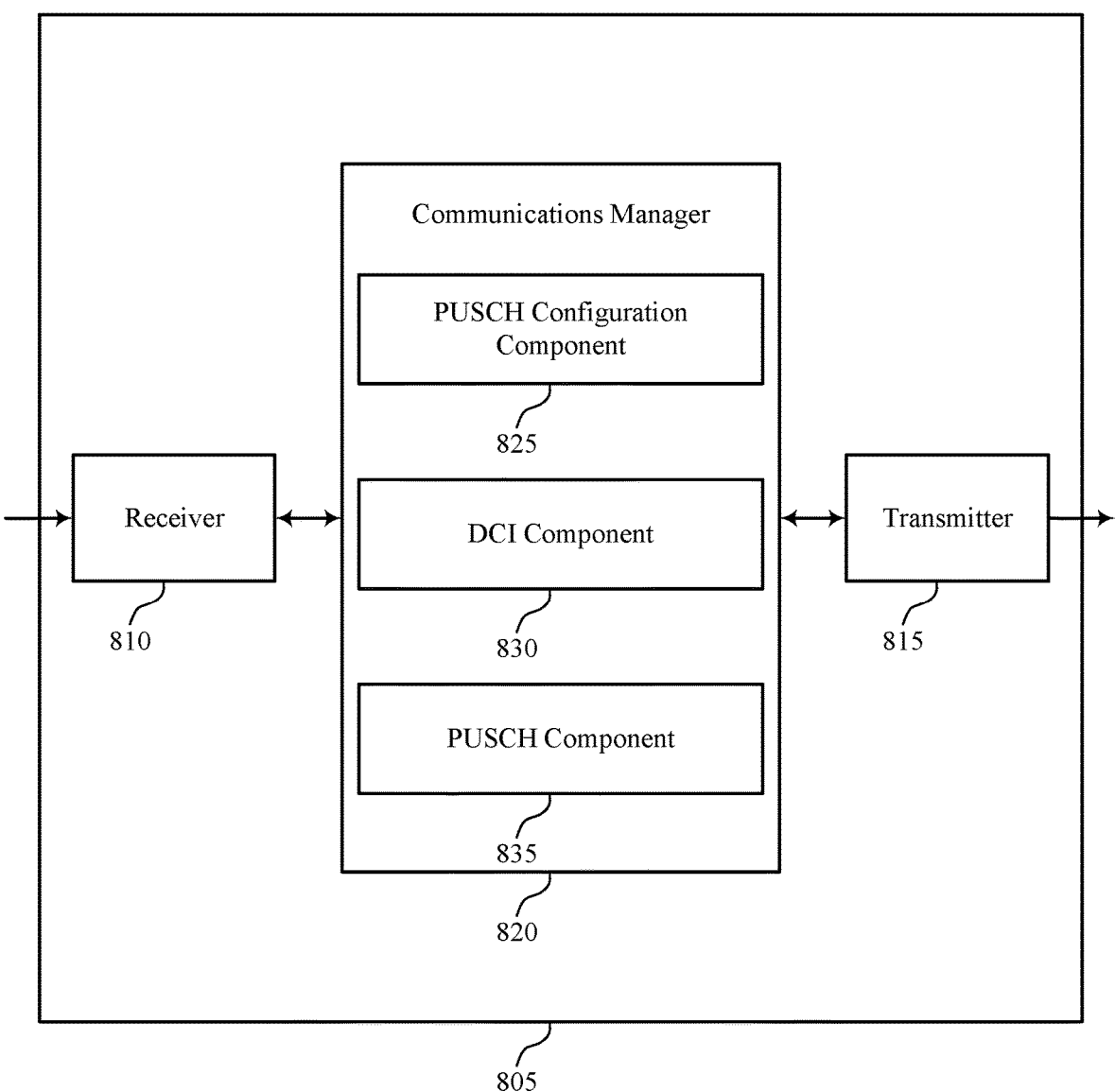

FIG. 8 shows a block diagram 800 of a device 805 that supports techniques for interpreting DCI fields in codebook-based multi-panel deployments with dynamic panel switching in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for interpreting DCI fields in codebook-based multi-panel deployments with dynamic panel switching). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for interpreting DCI fields in codebook-based multi-panel deployments with dynamic panel switching). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for interpreting DCI fields in codebook-based multi-panel deployments with dynamic panel switching as described herein. For example, the communications manager 820 may include an PUSCH configuration component 825, a DCI component 830, an PUSCH component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The PUSCH configuration component 825 may be configured as or otherwise support a means for receiving one or more control messages that indicate: a quantity of a set of multiple SRS resource sets configured at the UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The DCI component 830 may be configured as or otherwise support a means for receiving a downlink control information message that schedules an uplink shared channel message, the downlink control information message including the one or more SRS resource indicator fields and the one or more TPMI fields. The PUSCH component 835 may be configured as or otherwise support a means for transmitting the uplink shared channel message in accordance with the mapping between the content of the one or more TPMI fields and the quantity of ports associated with the at least one SRS resource from the set of multiple SRS resource sets.

Figure 9:
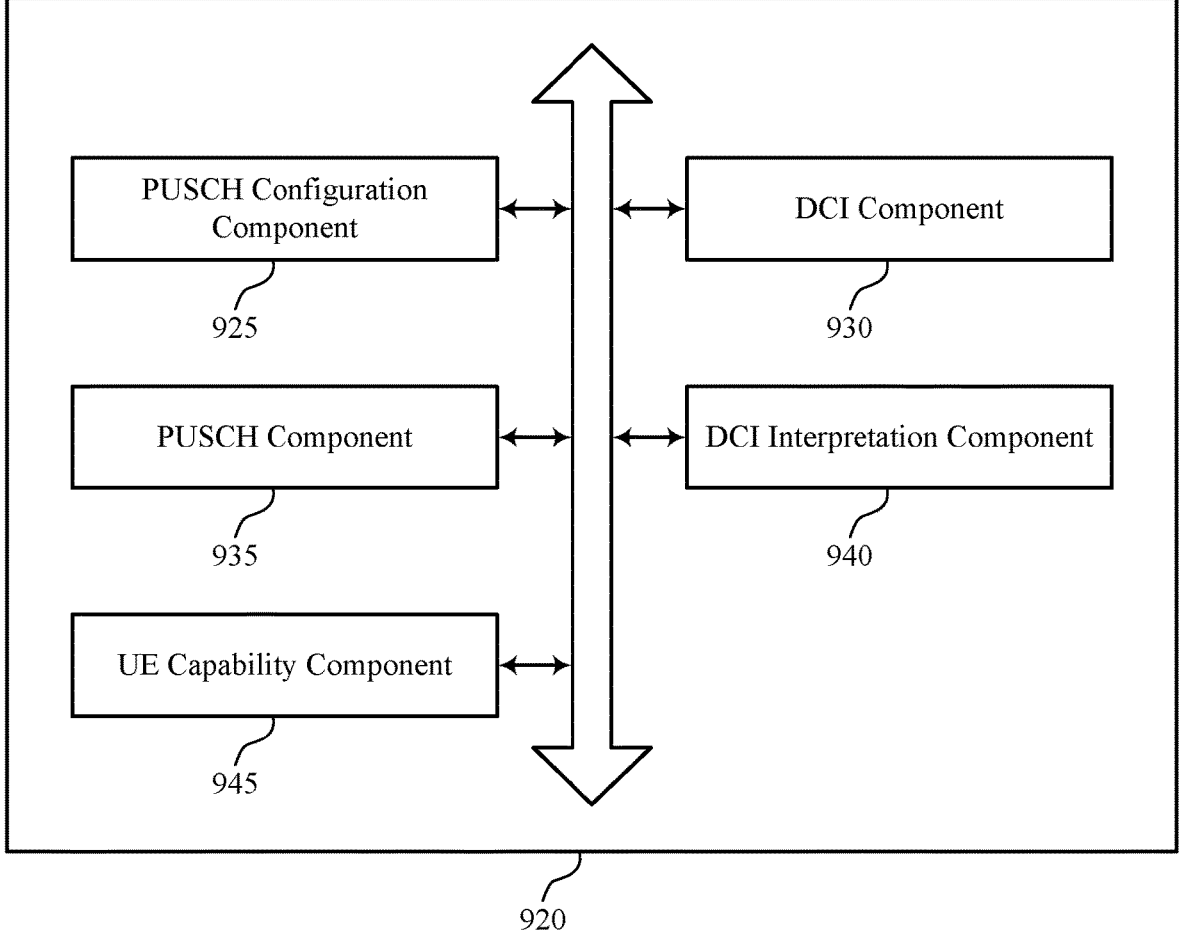
FIG. 9 shows a block diagram of a communications manager that supports techniques for interpreting DCI fields in codebook-based multi-panel deployments with dynamic panel switching in accordance with one or more aspects of the present disclosure.

FIG. 9 shows a block diagram 900 of a communications manager 920 that supports techniques for interpreting DCI fields in codebook-based multi-panel deployments with dynamic panel switching in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for interpreting DCI fields in codebook-based multi-panel deployments with dynamic panel switching as described herein. For example, the communications manager 920 may include an PUSCH configuration component 925, a DCI component 930, an PUSCH component 935, a DCI interpretation component 940, a UE capability component 945, or any combination thereof. Each of these components may communicate, directly or indirectly, with one another (e.g., via one or more buses).

The communications manager 920 may support wireless communication at a UE in accordance with examples as disclosed herein. The PUSCH configuration component 925 may be configured as or otherwise support a means for receiving one or more control messages that indicate: a quantity of a set of multiple SRS resource sets configured at the UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The DCI component 930 may be configured as or otherwise support a means for receiving a downlink control information message that schedules an uplink shared channel message, the downlink control information message including the one or more SRS resource indicator fields and the one or more TPMI fields. The PUSCH component 935 may be configured as or otherwise support a means for transmitting the uplink shared channel message in accordance with the mapping between the content of the one or more TPMI fields and the quantity of ports associated with the at least one SRS resource from the set of multiple SRS resource sets.

In some examples, to support receiving the downlink control information message, the DCI interpretation component 940 may be configured as or otherwise support a means for interpreting the one or more TPMI fields in accordance with the mapping indicated by the quantity of the set of multiple maximum rank values and the configured values of the set of one or more maximum number of ports values, where the one or more TPMI fields indicate up to a quantity of ports for each SRS resource indicated by the one or more SRS resource indicator fields.

In some examples, to support receiving the one or more control messages, the PUSCH configuration component 925 may be configured as or otherwise support a means for receiving an indication of a configuration associated with the set of multiple maximum rank values, where the configuration is either a first configuration or a second configuration, where the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

In some examples, the UE capability component 945 may be configured as or otherwise support a means for transmitting, via a capability report, information associated with the maximum quantity of ports the UE is capable of supporting when the uplink shared channel message is associated with the single SRS resource set, or when the uplink shared channel message is associated with multiple SRS resource sets, or both.

In some examples, to support receiving the one or more control messages that indicate the set of multiple maximum rank values and the one or more maximum number of ports values, the PUSCH configuration component 925 may be configured as or otherwise support a means for receiving an indication of a respective maximum rank value for each respective SRS resource set of the set of multiple SRS resource sets configured at the UE. In some examples, to support receiving the one or more control messages that indicate the set of multiple maximum rank values and the one or more maximum number of ports values, the PUSCH configuration component 925 may be configured as or otherwise support a means for receiving an indication of a respective maximum number of ports value for each respective SRS resource set of the set of multiple SRS resource sets.

In some examples, the set of multiple maximum rank values includes a first maximum rank value associated with a first SRS resource set and a second maximum rank value associated with a second SRS resource set. In some examples, the one or more maximum number of ports values includes a first maximum number of ports value associated with a first SRS resource indicated from the first SRS resource set and a second maximum number of ports value associated with a second SRS resource indicated from the second SRS resource set. In some examples, the mapping indicates that a first TPMI field indicates a first rank value less than or equal to the first maximum rank value and indicates a first quantity of ports less than the first maximum number of ports value associated with the first SRS resource if a first codepoint associated with the first SRS resource set is included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set is included in the SRS resource set indicator field of the downlink control information message; and the first TPMI field and the second TPMI field each indicate respective ranks that are less than or equal to the first maximum rank value and the second maximum rank value, respectively, and indicate respective quantities of ports that are less than or equal to the first maximum number of ports value and the second maximum rank value, respectively, if a third codepoint associated with both the first SRS resource set and the second SRS resource set is included in the SRS resource set indicator field of the downlink control information message.

In some examples, to support receiving the one or more control messages that indicate the set of multiple maximum rank values, the PUSCH configuration component 925 may be configured as or otherwise support a means for receiving an indication of a baseline maximum rank value and a baseline maximum number of ports value that are applicable to any one or more of the set of multiple SRS resource sets or any one or more SRS resources, respectively, when the uplink shared channel message is associated with a single SRS resource set. In some examples, to support receiving the one or more control messages that indicate the set of multiple maximum rank values, the PUSCH configuration component 925 may be configured as or otherwise support a means for receiving an indication of a respective set of one or more maximum rank values for each respective SRS resource set of the set of multiple SRS resource sets, where the respective set of one or more maximum rank values for each respective SRS resource set are applicable to that respective SRS resource set when the uplink shared channel message is associated with at least two SRS resource sets, and where the baseline maximum rank value is less than or equal to a summation of the respective set of one or more maximum rank values for each respective SRS resource set of the set of multiple SRS resource sets. In some examples, to support receiving the one or more control messages that indicate the set of multiple maximum rank values, the PUSCH configuration component 925 may be configured as or otherwise support a means for receiving an indication of a respective set of one or more maximum number of ports values for each respective SRS resource set of the set of multiple SRS resource sets, where the respective set of one or more maximum number of ports values for each respective SRS resource set are applicable to that respective SRS resource set when the uplink shared channel message is associated with the at least two SRS resource sets, and where the baseline maximum number of ports value is less than or equal to a summation of the respective set of one or more maximum number of ports values for each respective SRS resource set from the set of multiple SRS resource sets.

In some examples, the set of multiple maximum rank values includes the baseline maximum rank value that is applicable to both a first SRS resource set and a second SRS resource set, a first maximum rank value that is applicable to the first SRS resource set, and a second maximum rank value that is applicable to the second SRS resource set. In some examples, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set. In some examples, the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the first SRS resource set and the second SRS resource set is included in the SRS resource set indicator field of the downlink control information message.

In some examples, the set of multiple maximum rank values includes the baseline maximum rank value that is applicable to both a first SRS resource set and a second SRS resource set, a first maximum rank value that is applicable to the first SRS resource set, and a second maximum rank value that is applicable to the second SRS resource set. In some examples, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set. In some examples, the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field; and the single TPMI field indicates two ranks that are less than or equal to the first maximum rank value and the second maximum rank value, respectively, and indicates two quantities of ports that are less than or equal to the first maximum number of ports value and the second maximum number of ports value, respectively, if a third codepoint associated with both the first SRS resource set and the second SRS resource set is included in the single SRS resource indicator field.

In some examples, the set of multiple maximum rank values includes the baseline maximum rank value that is applicable to both a first SRS resource set and a second SRS resource set, a first maximum rank value that is applicable to the first SRS resource set, and a second maximum rank value that is applicable to the second SRS resource set. In some examples, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set. In some examples, the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates the first SRS resource and the second SRS resource, two ranks that are less than or equal to the first maximum rank value and the second maximum rank value, respectively, and two quantities of ports that are less than or equal to the first maximum number of ports value and the second maximum number of ports value, respectively, if a third codepoint associated with both the first SRS resource set and the second SRS resource set is included in the joint field.

In some examples, the set of multiple maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set. In some examples, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set. In some examples, the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the third SRS resource set and the fourth SRS resource set is included in the SRS resource set indicator field of the downlink control information message.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, the set of multiple maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set. In some examples, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set. In some examples, the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field of the downlink control information message; and the single TPMI field indicates two ranks that are less than or equal to the first maximum rank value and the second maximum rank value, respectively, and two quantities of ports that are less than or equal to the first maximum number of ports value and the second maximum number of ports value, respectively, if a third codepoint associated with both the third SRS resource set and the fourth SRS resource set is included in the single SRS resource indicator field of the downlink control information message.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, a joint field indicates an SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set is included in the joint field.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, each maximum rank value of the set of multiple maximum rank values is indicated per SRS resource set, per downlink control information format, per bandwidth part, or per component carrier.

In some examples, to support transmitting the uplink shared channel message in accordance with the mapping, the PUSCH component 935 may be configured as or otherwise support a means for transmitting the uplink shared channel message using one or more spatial domain filters corresponding to the one or more TPMI fields.

In some examples, the downlink control information message indicates a dynamic switch between single transmission and reception point (TRP) operation and multi-TRP operation.

Figure 10:
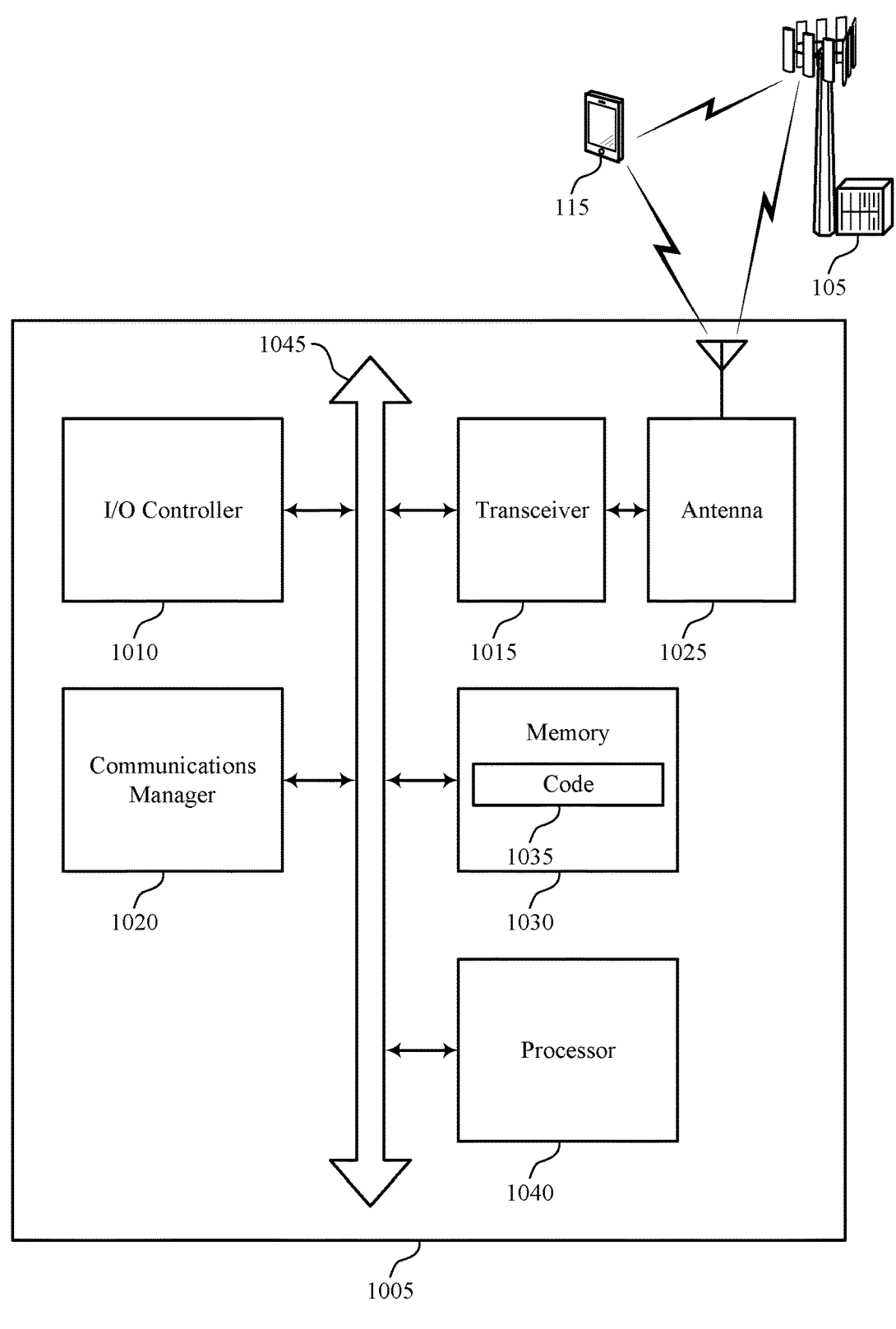
FIG. 10 shows a diagram of a system including a device that supports techniques for interpreting DCI fields in codebook-based multi-panel deployments with dynamic panel switching in accordance with one or more aspects of the present disclosure.

FIG. 10 shows a diagram of a system 1000 including a device 1005 that supports techniques for interpreting DCI fields in codebook-based multi-panel deployments with dynamic panel switching in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for interpreting DCI fields in codebook-based multi-panel deployments with dynamic panel switching). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving one or more control messages that indicate: a quantity of a set of multiple SRS resource sets configured at the UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The communications manager 1020 may be configured as or otherwise support a means for receiving a downlink control information message that schedules an uplink shared channel message, the downlink control information message including the one or more SRS resource indicator fields and the one or more TPMI fields. The communications manager 1020 may be configured as or otherwise support a means for transmitting the uplink shared channel message in accordance with the mapping between the content of the one or more TPMI fields and the quantity of ports associated with the at least one SRS resource from the set of multiple SRS resource sets.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for interpreting DCI fields in codebook-based multi-panel deployments with dynamic panel switching as described herein, or the processor 1040 and the memory 1030 may be otherwise configured to perform or support such operations.

Figure 11:
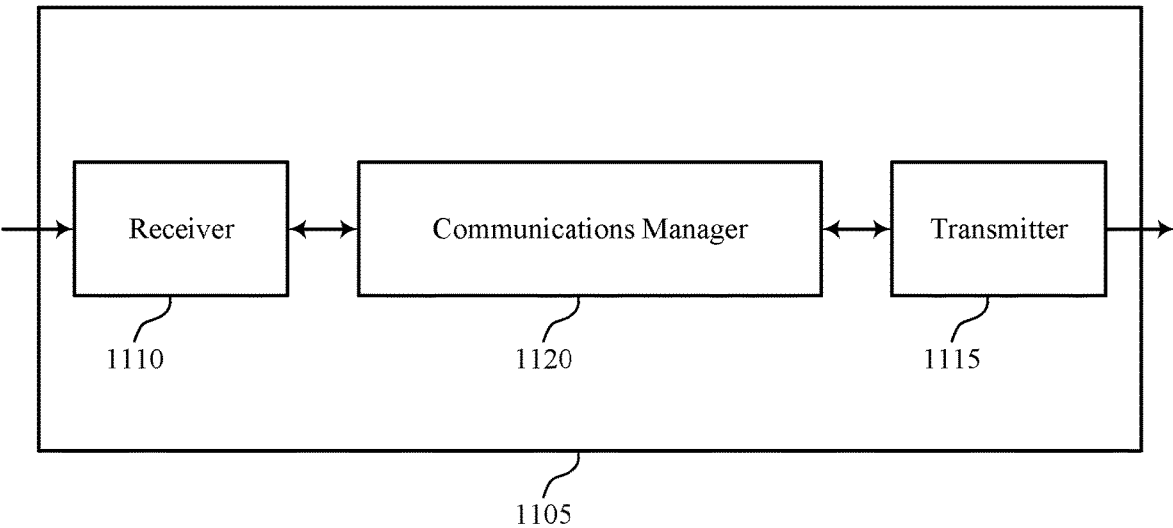
FIGS. 11 and 12 show block diagrams of devices that support techniques for interpreting DCI fields in codebook-based multi-panel deployments with dynamic panel switching in accordance with one or more aspects of the present disclosure.

FIG. 11 shows a block diagram 1100 of a device 1105 that supports techniques for interpreting DCI fields in codebook-based multi-panel deployments with dynamic panel switching in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for interpreting DCI fields in codebook-based multi-panel deployments with dynamic panel switching as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting one or more control messages that indicate a quantity of a set of multiple SRS resource sets configured at a UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The communications manager 1120 may be configured as or otherwise support a means for transmitting a downlink control information message that schedules an uplink shared channel message, the downlink control information message including the one or more SRS resource indicator fields and the one or more TPMI fields. The communications manager 1120 may be configured as or otherwise support a means for receiving the uplink shared channel message in accordance with the mapping between the content of the one or more TPMI fields and the quantity of ports associated with the at least one SRS resource from the set of multiple SRS resource sets.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
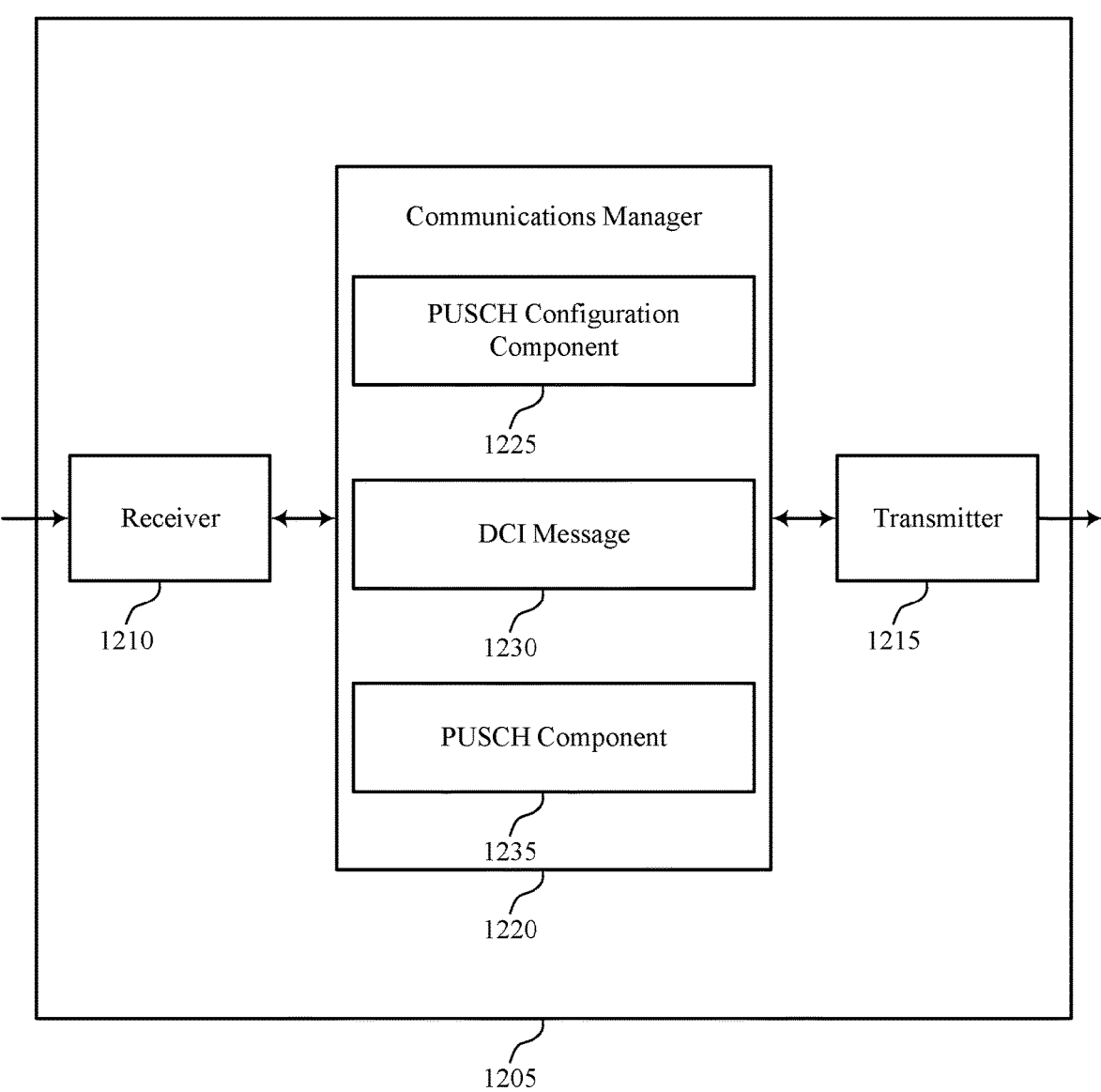

FIG. 12 shows a block diagram 1200 of a device 1205 that supports techniques for interpreting DCI fields in codebook-based multi-panel deployments with dynamic panel switching in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for interpreting DCI fields in codebook-based multi-panel deployments with dynamic panel switching as described herein. For example, the communications manager 1220 may include an PUSCH configuration component 1225, a DCI message 1230, an PUSCH component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The PUSCH configuration component 1225 may be configured as or otherwise support a means for transmitting one or more control messages that indicate a quantity of a set of multiple SRS resource sets configured at a UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The DCI message 1230 may be configured as or otherwise support a means for transmitting a downlink control information message that schedules an uplink shared channel message, the downlink control information message including the one or more SRS resource indicator fields and the one or more TPMI fields. The PUSCH component 1235 may be configured as or otherwise support a means for receiving the uplink shared channel message in accordance with the mapping between the content of the one or more TPMI fields and the quantity of ports associated with the at least one SRS resource from the set of multiple SRS resource sets.

Figure 13:
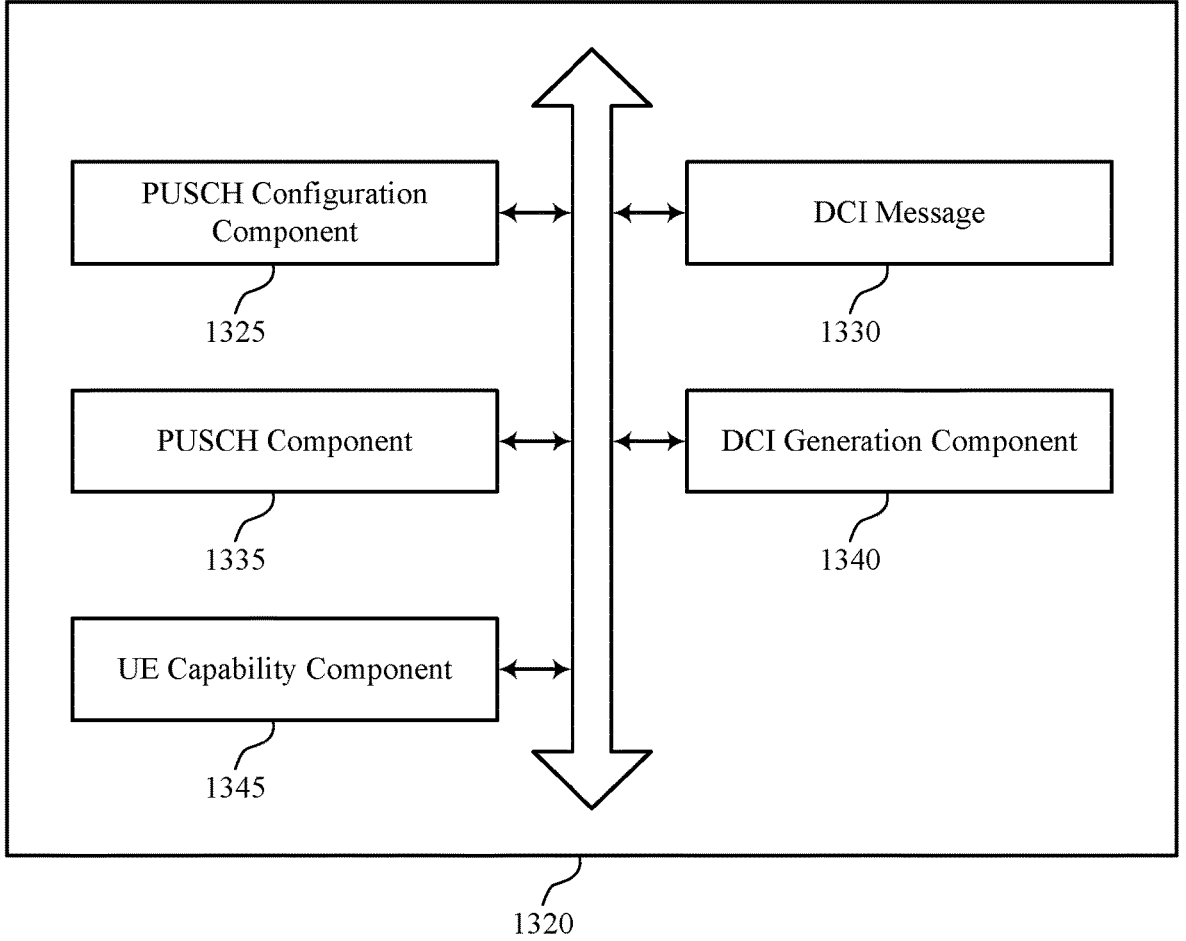
FIG. 13 shows a block diagram of a communications manager that supports techniques for interpreting DCI fields in codebook-based multi-panel deployments with dynamic panel switching in accordance with one or more aspects of the present disclosure.

FIG. 13 shows a block diagram 1300 of a communications manager 1320 that supports techniques for interpreting DCI fields in codebook-based multi-panel deployments with dynamic panel switching in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for interpreting DCI fields in codebook-based multi-panel deployments with dynamic panel switching as described herein. For example, the communications manager 1320 may include an PUSCH configuration component 1325, a DCI message 1330, an PUSCH component 1335, a DCI generation component 1340, a UE capability component 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The PUSCH configuration component 1325 may be configured as or otherwise support a means for transmitting one or more control messages that indicate a quantity of a set of multiple SRS resource sets configured at a UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The DCI message 1330 may be configured as or otherwise support a means for transmitting a downlink control information message that schedules an uplink shared channel message, the downlink control information message including the one or more SRS resource indicator fields and the one or more TPMI fields. The PUSCH component 1335 may be configured as or otherwise support a means for receiving the uplink shared channel message in accordance with the mapping between the content of the one or more TPMI fields and the quantity of ports associated with the at least one SRS resource from the set of multiple SRS resource sets.

In some examples, to support transmitting the downlink control information message, the DCI generation component 1340 may be configured as or otherwise support a means for generating the one or more TPMI fields in accordance with the mapping indicated by the quantity of the set of multiple maximum rank values and the configured values of the set of one or more maximum number of ports values, where the one or more TPMI fields indicate up to a quantity of ports for each SRS resource indicated by the one or more SRS resource indicator fields.

In some examples, to support transmitting the one or more control messages, the PUSCH configuration component 1325 may be configured as or otherwise support a means for transmitting an indication of a configuration associated with the set of multiple maximum rank values, where the configuration is either a first configuration or a second configuration, where the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

In some examples, the UE capability component 1345 may be configured as or otherwise support a means for receiving, via a capability report, information associated with the maximum quantity of ports the UE is capable of supporting when the uplink shared channel message is associated with the single SRS resource set, or when the uplink shared channel message is associated with multiple SRS resource sets, or both.

In some examples, to support transmitting the one or more control messages that indicate the set of multiple maximum rank values and the one or more maximum number of ports values, the PUSCH configuration component 1325 may be configured as or otherwise support a means for transmitting an indication of a respective maximum rank value for each respective SRS resource set of the set of multiple SRS resource sets configured at the UE. In some examples, to support transmitting the one or more control messages that indicate the set of multiple maximum rank values and the one or more maximum number of ports values, the PUSCH configuration component 1325 may be configured as or otherwise support a means for transmitting an indication of a respective maximum number of ports value for each respective SRS resource set of the set of multiple SRS resource sets.

In some examples, the set of multiple maximum rank values includes a first maximum rank value associated with a first SRS resource set and a second maximum rank value associated with a second SRS resource set. In some examples, the one or more maximum number of ports values includes a first maximum number of ports value associated with a first SRS resource indicated from the first SRS resource set and a second maximum number of ports value associated with a second SRS resource indicated from the second SRS resource set. In some examples, the mapping indicates that a first TPMI field indicates a first rank value less than or equal to the first maximum rank value and indicates a first quantity of ports less than the first maximum number of ports value associated with the first SRS resource if a first codepoint associated with the first SRS resource set is included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set is included in the SRS resource set indicator field of the downlink control information message; and the first TPMI field and the second TPMI field each indicate respective ranks that are less than or equal to the first maximum rank value and the second maximum rank value, respectively, and indicate respective quantities of ports that are less than or equal to the first maximum number of ports value and the second maximum rank value, respectively, if a third codepoint associated with both the first SRS resource set and the second SRS resource set is included in the SRS resource set indicator field of the downlink control information message.

In some examples, to support transmitting the one or more control messages that indicate the set of multiple maximum rank values, the PUSCH configuration component 1325 may be configured as or otherwise support a means for transmitting an indication of a baseline maximum rank value and a baseline maximum number of ports value that are applicable to any one or more of the set of multiple SRS resource sets or any one or more SRS resources, respectively, when the uplink shared channel message is associated with a single SRS resource set. In some examples, to support transmitting the one or more control messages that indicate the set of multiple maximum rank values, the PUSCH configuration component 1325 may be configured as or otherwise support a means for transmitting an indication of a respective set of one or more maximum rank values for each respective SRS resource set of the set of multiple SRS resource sets, where the respective set of one or more maximum rank values for each respective SRS resource set are applicable to that respective SRS resource set when the uplink shared channel message is associated with at least two SRS resource sets, and where the baseline maximum rank value is less than or equal to a summation of the respective set of one or more maximum rank values for each respective SRS resource set of the set of multiple SRS resource sets. In some examples, to support transmitting the one or more control messages that indicate the set of multiple maximum rank values, the PUSCH configuration component 1325 may be configured as or otherwise support a means for transmitting an indication of a respective set of one or more maximum number of ports values for each respective SRS resource set of the set of multiple SRS resource sets, where the respective set of one or more maximum number of ports values for each respective SRS resource set are applicable to that respective SRS resource set when the uplink shared channel message is associated with the at least two SRS resource sets, and where the baseline maximum number of ports value is less than or equal to a summation of the respective set of one or more maximum number of ports values for each respective SRS resource from the set of multiple SRS resource sets.

In some examples, a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the first SRS resource set and the second SRS resource set is included in the SRS resource set indicator field of the downlink control information message.

In some examples, the set of multiple maximum rank values includes the baseline maximum rank value that is applicable to both a first SRS resource set and a second SRS resource set, a first maximum rank value that is applicable to the first SRS resource set, and a second maximum rank value that is applicable to the second SRS resource set. In some examples, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set. In some examples, the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field; and the single TPMI field indicates two ranks that are less than or equal to the first maximum rank value and the second maximum rank value, respectively, and indicates two quantities of ports that are less than or equal to the first maximum number of ports value and the second maximum number of ports value, respectively, if a third codepoint associated with both the first SRS resource set and the second SRS resource set is included in the single SRS resource indicator field.

In some examples, the set of multiple maximum rank values includes the baseline maximum rank value that is applicable to both a first SRS resource set and a second SRS resource set, a first maximum rank value that is applicable to the first SRS resource set, and a second maximum rank value that is applicable to the second SRS resource set. In some examples, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set. In some examples, the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates the first SRS resource and the second SRS resource, two ranks that are less than or equal to the first maximum rank value and the second maximum rank value, respectively, and two quantities of ports that are less than or equal to the first maximum number of ports value and the second maximum number of ports value, respectively, if a third codepoint associated with both the first SRS resource set and the second SRS resource set is included in the joint field.

In some examples, the set of multiple maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set. In some examples, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set. In some examples, the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the third SRS resource set and the fourth SRS resource set is included in the SRS resource set indicator field of the downlink control information message.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, the set of multiple maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set. In some examples, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set. In some examples, the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field of the downlink control information message; and the single TPMI field indicates two ranks that are less than or equal to the first maximum rank value and the second maximum rank value, respectively, and two quantities of ports that are less than or equal to the first maximum number of ports value and the second maximum number of ports value, respectively, if a third codepoint associated with both the third SRS resource set and the fourth SRS resource set is included in the single SRS resource indicator field of the downlink control information message.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, the set of multiple maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set. In some examples, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set. In some examples, the mapping indicates that a joint field indicates an SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set is included in the joint field.

In some examples, the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

In some examples, each maximum rank value of the set of multiple maximum rank values is indicated per SRS resource set, per downlink control information format, per bandwidth part, or per component carrier.

In some examples, to support transmitting the uplink shared channel message in accordance with the mapping, the PUSCH component 1335 may be configured as or otherwise support a means for transmitting the uplink shared channel message using one or more spatial domain filters corresponding to the one or more TPMI fields.

In some examples, the downlink control information message indicates a dynamic switch between single transmission and reception point (TRP) operation and multi-TRP operation.

Figure 14:
FIG. 14 shows a diagram of a system including a device that supports techniques for interpreting DCI fields in codebook-based multi-panel deployments with dynamic panel switching in accordance with one or more aspects of the present disclosure.

FIG. 14 shows a diagram of a system 1400 including a device 1405 that supports techniques for interpreting DCI fields in codebook-based multi-panel deployments with dynamic panel switching in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for interpreting DCI fields in codebook-based multi-panel deployments with dynamic panel switching). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting one or more control messages that indicate a quantity of a set of multiple SRS resource sets configured at a UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The communications manager 1420 may be configured as or otherwise support a means for transmitting a downlink control information message that schedules an uplink shared channel message, the downlink control information message including the one or more SRS resource indicator fields and the one or more TPMI fields. The communications manager 1420 may be configured as or otherwise support a means for receiving the uplink shared channel message in accordance with the mapping between the content of the one or more TPMI fields and the quantity of ports associated with the at least one SRS resource from the set of multiple SRS resource sets.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for interpreting DCI fields in codebook-based multi-panel deployments with dynamic panel switching as described herein, or the processor 1435 and the memory 1425 may be otherwise configured to perform or support such operations.

FIG. 15 shows a flowchart illustrating a method 1500 that supports techniques for interpreting DCI fields in codebook-based multi-panel deployments with dynamic panel switching in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving one or more control messages that indicate: a quantity of a set of multiple SRS resource sets configured at the UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The operations of 1505 may be performed in accordance with examples as disclosed herein. In some examples, aspects of the operations of 1505 may be performed by an PUSCH configuration component 925 as described with reference to FIG. 9.

At 1510, the method may include receiving a downlink control information message that schedules an uplink shared channel message, the downlink control information message including the one or more SRS resource indicator fields and the one or more TPMI fields. The operations of 1510 may be performed in accordance with examples as disclosed herein. In some examples, aspects of the operations of 1510 may be performed by a DCI component 930 as described with reference to FIG. 9.

At 1515, the method may include transmitting the uplink shared channel message in accordance with the mapping between the content of the one or more TPMI fields and the quantity of ports associated with the at least one SRS resource from the set of multiple SRS resource sets. The operations of 1515 may be performed in accordance with examples as disclosed herein. In some examples, aspects of the operations of 1515 may be performed by an PUSCH component 935 as described with reference to FIG. 9.

FIG. 16 shows a flowchart illustrating a method 1600 that supports techniques for interpreting DCI fields in codebook-based multi-panel deployments with dynamic panel switching in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting one or more control messages that indicate a quantity of a set of multiple SRS resource sets configured at a UE, a quantity of one or more SRS resource indicator fields included in downlink control information, and a quantity of one or more transmit precoding matrix indicator (TPMI) fields included in the downlink control information, where the set of multiple SRS resource sets are configured for codebook usage, and a set of multiple maximum rank values and a set of one or more maximum number of ports values that are associated with uplink shared channel transmissions from the UE, where a quantity of the set of multiple maximum rank values and configured values of the set of one or more maximum number of ports values indicates a mapping between a content of the one or more TPMI fields and a quantity of ports associated with at least one SRS resource from the set of multiple SRS resource sets. The operations of 1605 may be performed in accordance with examples as disclosed herein. In some examples, aspects of the operations of 1605 may be performed by an PUSCH configuration component 1325 as described with reference to FIG. 13.

At 1610, the method may include transmitting a downlink control information message that schedules an uplink shared channel message, the downlink control information message including the one or more SRS resource indicator fields and the one or more TPMI fields. The operations of 1610 may be performed in accordance with examples as disclosed herein. In some examples, aspects of the operations of 1610 may be performed by a DCI message 1330 as described with reference to FIG. 13.

At 1615, the method may include receiving the uplink shared channel message in accordance with the mapping between the content of the one or more TPMI fields and the quantity of ports associated with the at least one SRS resource from the set of multiple SRS resource sets. The operations of 1615 may be performed in accordance with examples as disclosed herein. In some examples, aspects of the operations of 1615 may be performed by an PUSCH component 1335 as described with reference to FIG. 13.

The following provides an overview of aspects of the present disclosure:

Aspect 1: A method for wireless communication at a UE, comprising: receiving one or more control messages that indicate: a quantity of a plurality of SRS resource sets configured at the UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets; receiving a downlink control information message that schedules an uplink shared channel message, the downlink control information message including the one or more SRS resource indicator fields and the one or more TPMI fields; and transmitting the uplink shared channel message in accordance with the mapping between the content of the one or more TPMI fields and the quantity of ports associated with the at least one SRS resource from the plurality of SRS resource sets.

Aspect 2: The method of aspect 1, wherein receiving the downlink control information message further comprises: interpreting the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

Aspect 3: The method of any of aspects 1 through 2, wherein receiving the one or more control messages further comprises: receiving an indication of a configuration associated with the plurality of maximum rank values, wherein the configuration is either a first configuration or a second configuration, wherein the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

Aspect 4: The method of aspect 3, further comprising: transmitting, via a capability report, information associated with the maximum quantity of ports the UE is capable of supporting when the uplink shared channel message is associated with the single SRS resource set, or when the uplink shared channel message is associated with multiple SRS resource sets, or both.

Aspect 5: The method of any of aspects 1 through 4, wherein receiving the one or more control messages that indicate the plurality of maximum rank values and the one or more maximum number of ports values further comprises: receiving an indication of a respective maximum rank value for each respective SRS resource set of the plurality of SRS resource sets configured at the UE; receiving an indication of a respective maximum number of ports value for each respective SRS resource set of the plurality of SRS resource sets.

Aspect 6: The method of aspect 5, wherein the plurality of maximum rank values includes a first maximum rank value associated with a first SRS resource set and a second maximum rank value associated with a second SRS resource set, the one or more maximum number of ports values includes a first maximum number of ports value associated with a first SRS resource indicated from the first SRS resource set and a second maximum number of ports value associated with a second SRS resource indicated from the second SRS resource set, and the mapping indicates that a first TPMI field indicates a first rank value less than or equal to the first maximum rank value and indicates a first quantity of ports less than the first maximum number of ports value associated with the first SRS resource if a first codepoint associated with the first SRS resource set is included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set is included in the SRS resource set indicator field of the downlink control information message; and the first TPMI field and the second TPMI field each indicate respective ranks that are less than or equal to the first maximum rank value and the second maximum rank value, respectively, and indicate respective quantities of ports that are less than or equal to the first maximum number of ports value and the second maximum rank value, respectively, if a third codepoint associated with both the first SRS resource set and the second SRS resource set is included in the SRS resource set indicator field of the downlink control information message.

Aspect 7: The method of any of aspects 1 through 6, wherein receiving the one or more control messages that indicate the plurality of maximum rank values further comprises: receiving an indication of a baseline maximum rank value and a baseline maximum number of ports value that are applicable to any one or more of the plurality of SRS resource sets or any one or more SRS resources, respectively, when the uplink shared channel message is associated with a single SRS resource set; receiving an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with at least two SRS resource sets, and wherein the baseline maximum rank value is less than or equal to a summation of the respective set of one or more maximum rank values for each respective SRS resource set of the plurality of SRS resource sets; and receiving an indication of a respective set of one or more maximum number of ports values for each respective SRS resource set of the plurality of SRS resource sets, wherein the respective set of one or more maximum number of ports values for each respective SRS resource set are applicable to that respective SRS resource set when the uplink shared channel message is associated with the at least two SRS resource sets, and wherein the baseline maximum number of ports value is less than or equal to a summation of the respective set of one or more maximum number of ports values for each respective SRS resource set from the plurality of SRS resource sets.

Aspect 8: The method of aspect 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the first SRS resource set and the second SRS resource set is included in the SRS resource set indicator field of the downlink control information message.

Aspect 9: The method of aspect 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field; and the single TPMI field indicates two ranks that are less than or equal to the first maximum rank value and the second maximum rank value, respectively, and indicates two quantities of ports that are less than or equal to the first maximum number of ports value and the second maximum number of ports value, respectively, if a third codepoint associated with both the first SRS resource set and the second SRS resource set is included in the single SRS resource indicator field.

Aspect 10: The method of aspect 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates the first SRS resource and the second SRS resource, two ranks that are less than or equal to the first maximum rank value and the second maximum rank value, respectively, and two quantities of ports that are less than or equal to the first maximum number of ports value and the second maximum number of ports value, respectively, if a third codepoint associated with both the first SRS resource set and the second SRS resource set is included in the joint field.

Aspect 11: The method of aspect 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the third SRS resource set and the fourth SRS resource set is included in the SRS resource set indicator field of the downlink control information message.

Aspect 12: The method of aspect 11, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 13: The method of aspect 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field of the downlink control information message; and the single TPMI field indicates two ranks that are less than or equal to the first maximum rank value and the second maximum rank value, respectively, and two quantities of ports that are less than or equal to the first maximum number of ports value and the second maximum number of ports value, respectively, if a third codepoint associated with both the third SRS resource set and the fourth SRS resource set is included in the single SRS resource indicator field of the downlink control information message.

Aspect 14: The method of aspect 13, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 15: The method of aspect 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, wherein the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and wherein the mapping indicates that a joint field indicates an SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set is included in the joint field.

Aspect 16: The method of aspect 15, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 17: The method of any of aspects 1 through 16, wherein each maximum rank value of the plurality of maximum rank values is indicated per SRS resource set, per downlink control information format, per bandwidth part, or per component carrier.

Aspect 18: The method of any of aspects 1 through 17, wherein transmitting the uplink shared channel message in accordance with the mapping comprises: transmitting the uplink shared channel message using one or more spatial domain filters corresponding to the one or more TPMI fields.

Aspect 19: The method of any of aspects 1 through 18, wherein the downlink control information message indicates a dynamic switch between single transmission and reception point (TRP) operation and multi-TRP operation.

Aspect 20: A method for wireless communication at a network entity, comprising: transmitting one or more control messages that indicate a quantity of a plurality of SRS resource sets configured at a UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets; transmitting a downlink control information message that schedules an uplink shared channel message, the downlink control information message including the one or more SRS resource indicator fields and the one or more TPMI fields; and receiving the uplink shared channel message in accordance with the mapping between the content of the one or more TPMI fields and the quantity of ports associated with the at least one SRS resource from the plurality of SRS resource sets.

Aspect 21: The method of aspect 20, wherein transmitting the downlink control information message further comprises: generating the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

Aspect 22: The method of any of aspects 20 through 21, wherein transmitting the one or more control messages further comprises: transmitting an indication of a configuration associated with the plurality of maximum rank values, wherein the configuration is either a first configuration or a second configuration, wherein the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

Aspect 23: The method of aspect 22, further comprising: receiving, via a capability report, information associated with the maximum quantity of ports the UE is capable of supporting when the uplink shared channel message is associated with the single SRS resource set, or when the uplink shared channel message is associated with multiple SRS resource sets, or both.

Aspect 24: The method of any of aspects 20 through 23, wherein transmitting the one or more control messages that indicate the plurality of maximum rank values and the one or more maximum number of ports values further comprises: transmitting an indication of a respective maximum rank value for each respective SRS resource set of the plurality of SRS resource sets configured at the UE; and transmitting an indication of a respective maximum number of ports value for each respective SRS resource set of the plurality of SRS resource sets.

Aspect 25: The method of aspect 24, wherein the plurality of maximum rank values includes a first maximum rank value associated with a first SRS resource set and a second maximum rank value associated with a second SRS resource set, the one or more maximum number of ports values includes a first maximum number of ports value associated with a first SRS resource indicated from the first SRS resource set and a second maximum number of ports value associated with a second SRS resource indicated from the second SRS resource set, and the mapping indicates that a first TPMI field indicates a first rank value less than or equal to the first maximum rank value and indicates a first quantity of ports less than the first maximum number of ports value associated with the first SRS resource if a first codepoint associated with the first SRS resource set is included in an SRS resource set indicator field of the downlink control information message; a second TPMI field indicates a second rank value less than or equal to the second maximum rank value and indicates a second quantity of ports less than the second maximum number of ports value associated with the second SRS resource if an optional second codepoint associated with the second SRS resource set is included in the SRS resource set indicator field of the downlink control information message; and the first TPMI field and the second TPMI field each indicate respective ranks that are less than or equal to the first maximum rank value and the second maximum rank value, respectively, and indicate respective quantities of ports that are less than or equal to the first maximum number of ports value and the second maximum rank value, respectively, if a third codepoint associated with both the first SRS resource set and the second SRS resource set is included in the SRS resource set indicator field of the downlink control information message.

Aspect 26: The method of any of aspects 20 through 25, wherein transmitting the one or more control messages that indicate the plurality of maximum rank values further comprises: transmitting an indication of a baseline maximum rank value and a baseline maximum number of ports value that are applicable to any one or more of the plurality of SRS resource sets or any one or more SRS resources, respectively, when the uplink shared channel message is associated with a single SRS resource set; transmitting an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with at least two SRS resource sets, and wherein the baseline maximum rank value is less than or equal to a summation of the respective set of one or more maximum rank values for each respective SRS resource set of the plurality of SRS resource sets; and transmitting an indication of a respective set of one or more maximum number of ports values for each respective SRS resource set of the plurality of SRS resource sets, wherein the respective set of one or more maximum number of ports values for each respective SRS resource set are applicable to that respective SRS resource set when the uplink shared channel message is associated with the at least two SRS resource sets, and wherein the baseline maximum number of ports value is less than or equal to a summation of the respective set of one or more maximum number of ports values for each respective SRS resource from the plurality of SRS resource sets.

Aspect 27: The method of aspect 26, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, wherein the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and wherein the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the first SRS resource set and the second SRS resource set is included in the SRS resource set indicator field of the downlink control information message.

Aspect 28: The method of aspect 26, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field; and the single TPMI field indicates two ranks that are less than or equal to the first maximum rank value and the second maximum rank value, respectively, and indicates two quantities of ports that are less than or equal to the first maximum number of ports value and the second maximum number of ports value, respectively, if a third codepoint associated with both the first SRS resource set and the second SRS resource set is included in the single SRS resource indicator field.

Aspect 29: The method of aspect 26, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and the mapping indicates that a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates the first SRS resource and the second SRS resource, two ranks that are less than or equal to the first maximum rank value and the second maximum rank value, respectively, and two quantities of ports that are less than or equal to the first maximum number of ports value and the second maximum number of ports value, respectively, if a third codepoint associated with both the first SRS resource set and the second SRS resource set is included in the joint field.

Aspect 30: The method of aspect 26, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message; the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the third SRS resource set and the fourth SRS resource set is included in the SRS resource set indicator field of the downlink control information message.

Aspect 31: The method of aspect 30, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 32: The method of aspect 26, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field of the downlink control information message; the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field of the downlink control information message; and the single TPMI field indicates two ranks that are less than or equal to the first maximum rank value and the second maximum rank value, respectively, and two quantities of ports that are less than or equal to the first maximum number of ports value and the second maximum number of ports value, respectively, if a third codepoint associated with both the third SRS resource set and the fourth SRS resource set is included in the single SRS resource indicator field of the downlink control information message.

Aspect 33: The method of aspect 32, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 34: The method of aspect 26, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and the mapping indicates that a joint field indicates an SRS resource from the first SRS resource set, a first rank less than or equal to the baseline maximum rank value, and a first quantity of ports less than or equal to the baseline maximum number of ports value if a first codepoint associated with the first SRS resource set is included in the joint field; the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set is included in the joint field.

Aspect 35: The method of aspect 34, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

Aspect 36: The method of any of aspects 20 through 35, wherein each maximum rank value of the plurality of maximum rank values is indicated per SRS resource set, per downlink control information format, per bandwidth part, or per component carrier.

Aspect 37: The method of any of aspects 20 through 36, wherein transmitting the uplink shared channel message in accordance with the mapping comprises: transmitting the uplink shared channel message using one or more spatial domain filters corresponding to the one or more TPMI fields.

Aspect 38: The method of any of aspects 20 through 37, wherein the downlink control information message indicates a dynamic switch between single transmission and reception point (TRP) operation and multi-TRP operation.

Aspect 39: An apparatus for wireless communication at a UE, comprising one or more memories storing processor-executable code; and one or more processors coupled with the one or more memories and, when executing the code, configured to perform a method of any of aspects 1 through 19.

Aspect 40: An apparatus for wireless communication at a UE, comprising at least one means for performing a method of any of aspects 1 through 19.

Aspect 41: A non-transitory computer-readable medium storing code for wireless communication at a UE, the code comprising instructions executable by one or more processors to perform a method of any of aspects 1 through 19.

Aspect 42: An apparatus for wireless communication at a network entity, comprising one or more memories storing processor-executable code; and one or more processors coupled with the one or more memories and, when executing the code, configured to perform a method of any of aspects 20 through 38.

Aspect 43: An apparatus for wireless communication at a network entity, comprising at least one means for performing a method of any of aspects 20 through 38.

Aspect 44: A non-transitory computer-readable medium storing code for wireless communication at a network entity, the code comprising instructions executable by one or more processors to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

one or more memories storing processor-executable code; and and one or more processors coupled with the one or more memories and, when executing the code, configured to:

receive one or more control messages that indicate:

a quantity of a plurality of sounding reference signal (SRS) resource sets configured at the UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets;

receive a downlink control information message that schedules an uplink shared channel message, the downlink control information message including the one or more SRS resource indicator fields and the one or more TPMI fields; and transmit the uplink shared channel message in accordance with the mapping between the content of the one or more TPMI fields and the quantity of ports associated with the at least one SRS resource from the plurality of SRS resource sets.

2. The apparatus of claim 1, wherein, to receive the downlink control information message, the one or more processors, when executing the code, are further configured to:

interpret the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

3. The apparatus of claim 1, wherein, to receive the one or more control messages, the one or more processors, when executing the code, are further configured to:

receive an indication of a configuration associated with the plurality of maximum rank values, wherein the configuration is either a first configuration or a second configuration, wherein:

the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

4. The apparatus of claim 3, wherein the one or more processors, when executing the code, are further configured to:

transmit, via a capability report, information associated with the maximum quantity of ports the UE is capable of supporting when the uplink shared channel message is associated with the single SRS resource set, or when the uplink shared channel message is associated with multiple SRS resource sets, or both.

5. The apparatus of claim 1, wherein, to receive the one or more control messages that indicate the plurality of maximum rank values and the one or more maximum number of ports values, the one or more processors, when executing the code, are further configured to:

receive an indication of a respective maximum rank value for each respective SRS resource set of the plurality of SRS resource sets configured at the UE; and receive an indication of a respective maximum number of ports value for each respective SRS resource set of the plurality of SRS resource sets.

6. The apparatus of claim 5, wherein the plurality of maximum rank values includes a first maximum rank value associated with a first SRS resource set and a second maximum rank value associated with a second SRS resource set, wherein the one or more maximum number of ports values includes a first maximum number of ports value associated with a first SRS resource indicated from the first SRS resource set and a second maximum number of ports value associated with a second SRS resource indicated from the second SRS resource set, and wherein the mapping indicates that:

a first TPMI field indicates a first rank value less than or equal to the first maximum rank value and indicates a first quantity of ports less than the first maximum number of ports value associated with the first SRS resource if a first codepoint associated with the first SRS resource set is included in an SRS resource set indicator field of the downlink control information message;

a second TPMI field indicates a second rank value less than or equal to the second maximum rank value and indicates a second quantity of ports less than the second maximum number of ports value associated with the second SRS resource if an optional second codepoint associated with the second SRS resource set is included in the SRS resource set indicator field of the downlink control information message; and the first TPMI field and the second TPMI field each indicate respective ranks that are less than or equal to the first maximum rank value and the second maximum rank value, respectively, and indicate respective quantities of ports that are less than or equal to the first maximum number of ports value and the second maximum rank value, respectively, if a third codepoint associated with both the first SRS resource set and the second SRS resource set is included in the SRS resource set indicator field of the downlink control information message.

7. The apparatus of claim 1, wherein, to receive the one or more control messages that indicate the plurality of maximum rank values, the one or more processors, when executing the code, are further configured to:

receive an indication of a baseline maximum rank value and a baseline maximum number of ports value that are applicable to any one or more of the plurality of SRS resource sets or any one or more SRS resources, respectively, when the uplink shared channel message is associated with a single SRS resource set;

receive an indication of a respective set of one or more maximum rank values for each respective SRS resource set of the plurality of SRS resource sets, wherein the respective set of one or more maximum rank values for each respective SRS resource set are applicable to that respective SRS resource set when the uplink shared channel message is associated with at least two SRS resource sets, and wherein the baseline maximum rank value is less than or equal to a summation of the respective set of one or more maximum rank values for each respective SRS resource set of the plurality of SRS resource sets; and receive an indication of a respective set of one or more maximum number of ports values for each respective SRS resource set of the plurality of SRS resource sets, wherein the respective set of one or more maximum number of ports values for each respective SRS resource set are applicable to that respective SRS resource set when the uplink shared channel message is associated with the at least two SRS resource sets, and wherein the baseline maximum number of ports value is less than or equal to a summation of the respective set of one or more maximum number of ports values for each respective SRS resource set from the plurality of SRS resource sets.

8. The apparatus of claim 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, wherein the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and wherein the mapping indicates that:

a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message;

the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the first SRS resource set and the second SRS resource set is included in the SRS resource set indicator field of the downlink control information message.

9. The apparatus of claim 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, wherein the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and wherein the mapping indicates that:

a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field;

the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field; and the single TPMI field indicates two ranks that are less than or equal to the first maximum rank value and the second maximum rank value, respectively, and indicates two quantities of ports that are less than or equal to the first maximum number of ports value and the second maximum number of ports value, respectively, if a third codepoint associated with both the first SRS resource set and the second SRS resource set is included in the single SRS resource indicator field.

10. The apparatus of claim 7, wherein the plurality of maximum rank values includes the baseline maximum rank value that is applicable to both a first SRS resource set and a second SRS resource set, a first maximum rank value that is applicable to the first SRS resource set, and a second maximum rank value that is applicable to the second SRS resource set, wherein the one or more maximum number of ports values includes the baseline maximum number of ports values, a first maximum number of ports value associated with a first SRS resource indicated from the first SRS resource set, and a second maximum number of ports value associated with a second SRS resource indicated from the second SRS resource set, and wherein the mapping indicates that:

a joint field indicates a first SRS resource from the first SRS resource set, a first rank less than or equal to the baseline maximum rank value, and a first quantity of ports less than or equal to the baseline maximum number of ports value if a first codepoint associated with the first SRS resource set is included in the joint field;

the joint field indicates a second SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates the first SRS resource and the second SRS resource, two ranks that are less than or equal to the first maximum rank value and the second maximum rank value, respectively, and two quantities of ports that are less than or equal to the first maximum number of ports value and the second maximum number of ports value, respectively, if a third codepoint associated with both the first SRS resource set and the second SRS resource set is included in the joint field.

11. The apparatus of claim 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, wherein the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and wherein the mapping indicates that:

a concatenation of a first TPMI field and a second TPMI field indicates a first rank less than or equal to the baseline maximum rank value and indicates a first quantity of ports less than or equal to the baseline maximum number of ports value if a first codepoint associated with the first SRS resource set is included in an SRS resource set indicator field of the downlink control information message;

the concatenation of the first TPMI field and the second TPMI field indicates a second rank less than or equal to the baseline maximum rank value and indicates a second quantity of ports less than or equal to the baseline maximum number of ports value if an optional second codepoint associated with the second SRS resource set is included in the SRS resource set indicator field of the downlink control information message; and the first TPMI field and the second TPMI field indicate respective ranks that are less than or equal to the first maximum rank value and the second maximum rank value, respectively, and indicate respective quantities of ports that are less than or equal to the first maximum number of ports value and the second maximum number of ports value, respectively, if a third codepoint associated with both the third SRS resource set and the fourth SRS resource set is included in the SRS resource set indicator field of the downlink control information message.

12. The apparatus of claim 11, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

13. The apparatus of claim 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, wherein the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and wherein the mapping indicates that:

a single TPMI field indicates a first rank less than or equal to the baseline maximum rank value and indicates a first quantity of ports less than or equal to the baseline maximum number of ports value if a first codepoint associated with the first SRS resource set is included in a single SRS resource indicator field of the downlink control information message;

the single TPMI field indicates a second rank less than or equal to the baseline maximum rank value and indicates a second quantity of ports less than or equal to the baseline maximum number of ports value if an optional second codepoint associated with the second SRS resource set is included in the single SRS resource indicator field of the downlink control information message; and the single TPMI field indicates two ranks that are less than or equal to the first maximum rank value and the second maximum rank value, respectively, and two quantities of ports that are less than or equal to the first maximum number of ports value and the second maximum number of ports value, respectively, if a third codepoint associated with both the third SRS resource set and the fourth SRS resource set is included in the single SRS resource indicator field of the downlink control information message.

14. The apparatus of claim 13, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

15. The apparatus of claim 7, wherein the plurality of maximum rank values includes the baseline maximum rank value that is applicable to one or both of a first SRS resource set and a second SRS resource set, a first maximum rank value that is applicable to a third SRS resource set, and a second maximum rank value that is applicable to a fourth SRS resource set, wherein the one or more maximum number of ports values includes the baseline maximum number of ports value that is applicable to SRS resources from one or both of the first SRS resource set and the second SRS resource set, a first maximum number of ports value associated with a first SRS resource indicated from the third SRS resource set, and a second maximum number of ports value associated with a second SRS resource indicated from the fourth SRS resource set, and wherein the mapping indicates that:

a joint field indicates an SRS resource from the first SRS resource set, a first rank less than or equal to the baseline maximum rank value, and a first quantity of ports less than or equal to the baseline maximum number of ports value if a first codepoint associated with the first SRS resource set is included in the joint field;

the joint field indicates an SRS resource from the second SRS resource set, a second rank less than or equal to the baseline maximum rank value, and a second quantity of ports less than or equal to the baseline maximum number of ports value if an optional second codepoint associated with the second SRS resource set is included in the joint field; and the joint field indicates a third SRS resource from the third SRS resource set, a third rank less than or equal to the first maximum rank value, and a third quantity of ports less than or equal to the first maximum number of ports value and indicates a fourth SRS resource from the fourth SRS resource set, a fourth rank less than or equal to the second maximum rank value, and a fourth quantity of ports less than or equal to the second maximum number of ports value if a third codepoint associated with both the third SRS resource set and the fourth SRS resource set is included in the joint field.

16. The apparatus of claim 15, wherein the first SRS resource set and the second SRS resource set are exclusively configured for when the uplink shared channel message is associated with the single SRS resource set, and the third SRS resource set and the fourth SRS resource set are exclusively configured for when the uplink shared channel message is associated with at least two SRS resource sets.

17. The apparatus of claim 1, wherein each maximum rank value of the plurality of maximum rank values is indicated per SRS resource set, per downlink control information format, per bandwidth part, or per component carrier.

18. The apparatus of claim 1, wherein, to transmit the uplink shared channel message in accordance with the mapping, the one or more processors, when executing the code, are further configured to:

transmit the uplink shared channel message using one or more spatial domain filters corresponding to the one or more TPMI fields.

19. The apparatus of claim 1, wherein the downlink control information message indicates a dynamic switch between single transmission and reception point (TRP) operation and multi-TRP operation.

20. An apparatus for wireless communication at a network entity, comprising:

one or more memories storing processor-executable code; and and one or more processors coupled with the one or more memories and, when executing the code, configured to:

transmit one or more control messages that indicate:

a quantity of a plurality of sounding reference signal (SRS) resource sets configured at a user equipment (UE), a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets;

transmit a downlink control information message that schedules an uplink shared channel message, the downlink control information message including the one or more SRS resource indicator fields and the one or more TPMI fields; and receive the uplink shared channel message in accordance with the mapping between the content of the one or more TPMI fields and the quantity of ports associated with the at least one SRS resource from the plurality of SRS resource sets.

21. The apparatus of claim 20, wherein, to transmit the downlink control information message, the one or more processors, when executing the code, are further configured to:

generate the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

22. The apparatus of claim 20, wherein, to transmit the one or more control messages, the one or more processors, when executing the code, are further configured to:

transmit an indication of a configuration associated with the plurality of maximum rank values, wherein the configuration is either a first configuration or a second configuration, wherein:

the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

23. The apparatus of claim 22, wherein the one or more processors, when executing the code, are further configured to:

receive, via a capability report, information associated with the maximum quantity of ports the UE is capable of supporting when the uplink shared channel message is associated with the single SRS resource set, or when the uplink shared channel message is associated with multiple SRS resource sets, or both.

24. The apparatus of claim 20, wherein, to transmit the one or more control messages that indicate the plurality of maximum rank values and the one or more maximum number of ports values, the one or more processors, when executing the code, are further configured to:

transmit an indication of a respective maximum rank value for each respective SRS resource set of the plurality of SRS resource sets configured at the UE; and transmit an indication of a respective maximum number of ports value for each respective SRS resource set of the plurality of SRS resource sets.

25. A method for wireless communication at a user equipment (UE), comprising:

receiving one or more control messages that indicate:

a quantity of a plurality of sounding reference signal (SRS) resource sets configured at the UE, a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets;

receiving a downlink control information message that schedules an uplink shared channel message, the downlink control information message including the one or more SRS resource indicator fields and the one or more TPMI fields; and transmitting the uplink shared channel message in accordance with the mapping between the content of the one or more TPMI fields and the quantity of ports associated with the at least one SRS resource from the plurality of SRS resource sets.

26. The method of claim 25, wherein receiving the downlink control information message further comprises:

interpreting the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

27. The method of claim 25, wherein receiving the one or more control messages further comprises:

receiving an indication of a configuration associated with the plurality of maximum rank values, wherein the configuration is either a first configuration or a second configuration, wherein:

the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

28. A method for wireless communication at a network entity, comprising:

transmitting one or more control messages that indicate:
  a quantity of a plurality of sounding reference signal (SRS) resource sets configured at a user equipment (UE), a quantity of one or more SRS resource indicator fields included in downlink control information, and a quantity of one or more transmit precoding matrix indicator (TPMI) fields included in the downlink control information, wherein the plurality of SRS resource sets are configured for codebook usage, and
  a plurality of maximum rank values and a set of one or more maximum number of ports values that are associated with uplink shared channel transmissions from the UE, wherein a quantity of the plurality of maximum rank values and configured values of the set of one or more maximum number of ports values indicates a mapping between a content of the one or more TPMI fields and a quantity of ports associated with at least one SRS resource from the plurality of SRS resource sets;

transmitting a downlink control information message that schedules an uplink shared channel message, the downlink control information message including the one or more SRS resource indicator fields and the one or more TPMI fields; and receiving the uplink shared channel message in accordance with the mapping between the content of the one or more TPMI fields and the quantity of ports associated with the at least one SRS resource from the plurality of SRS resource sets.

29. The method of claim 28, wherein transmitting the downlink control information message further comprises:

generating the one or more TPMI fields in accordance with the mapping indicated by the quantity of the plurality of maximum rank values and the configured values of the set of one or more maximum number of ports values, wherein the one or more TPMI fields indicate up to a quantity of ports for each SRS resource indicated by the one or more SRS resource indicator fields.

30. The method of claim 28, wherein transmitting the one or more control messages further comprises:

transmitting an indication of a configuration associated with the plurality of maximum rank values, wherein the configuration is either a first configuration or a second configuration, wherein:
  the first configuration indicates that, if the uplink shared channel message is associated with a single SRS resource set, a maximum quantity of ports associated with the uplink shared channel message is equal to a larger between a first maximum quantity of ports of a first SRS resource and a second maximum quantity of ports of a second SRS resource, and
  the second configuration indicates that, if the uplink shared channel message is associated with the single SRS resource set, the maximum quantity of ports associated with the uplink shared channel message is equal to a summation of the first maximum quantity of ports of the first SRS resource and the second maximum quantity of ports of the second SRS resource.

* * * * *